(12) United States Patent  
Motyka et al.

(10) Patent No.: US 12,175,709 B2  
(45) Date of Patent: Dec. 24, 2024

(54) LASER MARKED CALIBRATION STANDARDS FOR ON-LINE INSPECTION CAMERA QUALIFICATION AND METHODS OF USE

(71) Applicant: CORNING INCORPORATED, Corning, NY (US)

(72) Inventors: Michael Allen Motyka, Corning, NY (US); Shawn Lewis Pickering, Raleigh, NC (US); Kristopher Allen Wieland, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 313 days.

(21) Appl. No.: 17/710,321

(22) Filed: Mar. 31, 2022

(65) Prior Publication Data

US 2022/0319049 A1 Oct. 6, 2022

Related U.S. Application Data

(60) Provisional application No. 63/168,648, filed on Mar. 31, 2021.

(51) Int. Cl.
*G06T 7/80* (2017.01)
*G01N 21/90* (2006.01)
(Continued)

(52) U.S. Cl.
CPC .............. *G06T 7/80* (2017.01); *G01N 21/90* (2013.01); *G01N 21/93* (2013.01); *G06T 7/11* (2017.01); *G06T 2207/30208* (2013.01)

(58) Field of Classification Search
CPC ... G06T 7/80; G06T 7/11; G06T 2207/30208; G01N 21/90; G01N 21/93
See application file for complete search history.

(56) References Cited

U.S. PATENT DOCUMENTS

| 3,941,686 A | * | 3/1976 | Juvinall | ................. B07C 5/122 |
| | | | | 209/523 |
| 4,931,632 A | * | 6/1990 | Brandt | ................... G01N 21/90 |
| | | | | 250/223 B |

(Continued)

FOREIGN PATENT DOCUMENTS

| CN | 109626302 A | * | 4/2019 | ............... B67C 3/22 |
| WO | 2013/104365 A1 | | 7/2013 | |

OTHER PUBLICATIONS

"Illumination techniques for line scan cameras", Retrieved from: https://www.vision-doctor.com/en/line-scan-cameras/illumination-line-scan-camera.html, 2022, 7 pages.

(Continued)

*Primary Examiner* — Mohamed K Amara
(74) *Attorney, Agent, or Firm* — F. Brock Riggs

(57) ABSTRACT

Durable calibration standards are described herein for inspection systems for manufactured vials, such as glass pharmaceutical vials, and methods of using the same. A grayscale calibration standard is provided for calibration of camera settings of imaging components in an inspection system. The grayscale calibration standard comprises a vial having a laser etched gradient image on a portion of the vial. A region of interest (ROI) calibration standard is provided for calibration of spatial difference of imaging components and to align imaging components in an inspection system to capture desired regions of interest. The ROI calibration standard comprises a vial comprising laser etchings on one or more portions of the vial, wherein the laser etchings comprise laser markings formed in a geometric pattern. By providing laser-marked calibration standards, the calibration standards may be used in many different modes of metrology.

30 Claims, 19 Drawing Sheets

(51) Int. Cl.
*G01N 21/93* (2006.01)
*G06T 7/11* (2017.01)

(56) References Cited

U.S. PATENT DOCUMENTS

| | | | |
|---|---|---|---|
| 8,522,982 B2* | 9/2013 | Venaille | G01N 21/9045 |
| | | | 209/552 |
| 9,034,442 B2 | 5/2015 | Chang et al. | |
| 9,428,302 B2 | 8/2016 | Fadeev et al. | |
| 9,514,131 B1* | 12/2016 | Bochenko | G16H 10/40 |
| 2004/0152317 A1* | 8/2004 | Luetzen | H01L 21/3083 |
| | | | 257/E21.654 |
| 2005/0263443 A1* | 12/2005 | Martin | G01N 21/90 |
| | | | 209/522 |
| 2013/0171456 A1 | 7/2013 | Fadeev et al. | |
| 2013/0224407 A1 | 8/2013 | Fadeev et al. | |
| 2014/0001076 A1 | 1/2014 | Fadeev et al. | |
| 2014/0001143 A1 | 1/2014 | Fadeev et al. | |
| 2014/0151320 A1 | 6/2014 | Chang et al. | |
| 2014/0151321 A1 | 6/2014 | Chang et al. | |
| 2014/0151370 A1 | 6/2014 | Chang et al. | |
| 2015/0173848 A1* | 6/2015 | Bolan | A61M 31/005 |
| | | | 600/420 |
| 2015/0204780 A1 | 7/2015 | Wimmer | |
| 2015/0329416 A1 | 11/2015 | Fadeev et al. | |
| 2015/0360999 A1 | 12/2015 | Fadeev et al. | |
| 2016/0054234 A1* | 2/2016 | Niedermeier | G01N 21/9027 |
| | | | 356/240.1 |
| 2016/0356726 A1* | 12/2016 | Bathelet | G06K 7/1417 |
| 2017/0154438 A1* | 6/2017 | Kisner | G06T 5/00 |
| 2017/0345141 A1* | 11/2017 | Vivet | G06T 7/0004 |
| 2021/0069061 A1* | 3/2021 | Bochenko | A61J 7/04 |
| 2021/0131895 A1* | 5/2021 | Forestelli | G06T 7/001 |
| 2022/0309678 A1* | 9/2022 | Koch | G06T 7/0012 |
| 2022/0319049 A1* | 10/2022 | Motyka | G01N 21/93 |
| 2023/0296532 A1* | 9/2023 | Chan | G01N 21/9054 |
| | | | 356/240.1 |
| 2023/0334649 A1* | 10/2023 | Li | G06T 7/11 |
| 2024/0210432 A1* | 6/2024 | Fusaro | B01L 9/06 |

OTHER PUBLICATIONS

"Line Scan Camera Calibration Overview", Retrieved from: https://support.cognex.com/docs/cvl_900/web/EN/cvl_vision_tools/Content/Topics/VisionTools/Line_Scan_Camera_Calibra.htm, 2019, 1 page.

Johnston et al., "A Simplified Standard Method of Digital Image Tonal Capture for Archival Projects", IS&T's 2002 PICS Conference, 4 pages.

Underwood et al., "Extrinsic Parameter Calibration for Line Scanning Cameras on Ground Vehicles with Navigation Systems Using a Calibration Pattern", sensors MDPI, 2017, 27 pages.

International Search Report and Written Opinion of the International Searching Authority; PCT/US2022/022717; mailed on Jul. 6, 2022, 11 pages; European Patent Office.

* cited by examiner selecting a grayscale calibration standard based on a size of manufactured vials to be inspected

sending the grayscale calibration standard through a first inspection line and calibrating camera settings of the first inspection line to ensure consistency of camera settings in one or more imaging components of the first line

sending the grayscale calibration standard through a second inspection line and calibrating camera settings of the second inspection line to ensure consistency of camera settings in one or more imaging components of the second line and consistency of camera settings of the first and second inspection lines

sending the grayscale calibration standard through an nth inspection line and calibrating camera settings of the nth inspection line to ensure consistency of camera settings in one or more imaging components of the nth line and to ensure consistency of camera settings of the first through nth inspection lines

inspecting manufactured vials using the calibrated vial inspection system, wherein each manufactured vial is classified as accepted or rejected based on defects found

LASER MARKED CALIBRATION STANDARDS FOR ON-LINE INSPECTION CAMERA QUALIFICATION AND METHODS OF USE

CROSS-REFERENCE TO RELATED APPLICATIONS

This application claims the benefit of priority under 35 U.S.C. § 119 of U.S. Provisional Application Ser. No. 63/168,648 filed on Mar. 31, 2021, the content of which is relied upon and incorporated herein by reference in its entirety.

FIELD OF THE DISCLOSURE

This disclosure generally relates to calibration standards. This disclosure particularly relates to laser-marked calibration standards for inspection of medical vials.

BACKGROUND

Vials are an important component in the supply of medicine. Vials are containers used for holding medicine, such as vaccines, that will be administered to patients. Such medical vials must be manufactured in a way that provides for a safe drug delivery. As such, the quality of the vial is very important. If glass or other debris is inside the vial, the debris could be injected into a patient and could be very hazardous. Furthermore, flaws introduced during the vial creation process could compromise the integrity of a seal or the mechanical strength of the vial. Because of these concerns, inspection of every single container in multiple ways is important to ensure quality and safety standards are met.

Though vials can be manufactured quickly, often, inspection of the vials is the limiting time step during production. In order to shorten the duration of the inspection step, multiple inspection lines may be used for a single vial production line. In practice, such a system may be as simple as having vials designated by "A" or "B" and produced in the order "ABABAB" in a single production line, where every "A" vial is measured by one inspection system and every "B" vial is measured by a separate, identical inspection system. However, drawbacks to having multiple inspection systems include issues with ensuring the same inspection quality for all lines and all cameras, which is difficult when multiple inspection systems are used because the cameras are at different physical locations, have different lighting, and are pointing at different locations on the vials.

SUMMARY

According to an embodiment of this disclosure, calibration standards are provided, as well as methods of using said calibration standards to calibrate imaging components within an inspection system to ensure quality compliance during inspection of vials. The calibration standards allow for metrology systems to be calibrated across multiple inspection lines. The calibration standards described herein may be used as gold standard vials with specific laser marks. The calibration standards may be used for calibrating imaging components to capture images for desired regions of interest, for calibrating imaging components to determine spatial distance, and to calibrate the grayscale intensity on a non-planar surface. The calibration standards described herein differ from convention calibration technologies because the laser-etched vials allow for calibration of multiple modes of inspection, namely transmission and reflection.

In an aspect, a grayscale calibration standard for vial inspection is disclosed herein. The grayscale calibration standard comprises a vial comprising laser etching, wherein the laser etching comprises a gradient image on a portion of the vial.

In an embodiment, the portion of the vial comprises a sidewall of the vial and the laser etching is positioned in a vertical orientation along the sidewall.

In an embodiment, the laser etching is disposed on an exterior surface of the vial. In an embodiment, the laser etching has a depth of less than about 40 microns from the exterior surface.

In an embodiment, the laser etching is disposed on an interior surface of the vial. In an embodiment, the laser etching has a depth of less than about 40 microns from the interior surface.

In an embodiment, the laser etching is disposed on an interior portion of the sidewall of the vial. In an embodiment, the laser etching has a thickness of less than about 40 microns.

In an embodiment, the calibration standard is configured to calibrate imaging systems for inspection of manufactured vials.

In an embodiment, the inspection system comprises one or more inspection lines, each inspection line having one or more imaging components.

In an embodiment, the one or more imaging components comprise one or more cameras.

In an embodiment, the calibration standard is used to adjust camera settings of the imaging systems to ensure consistency between camera settings of the one or more cameras. In an embodiment, the camera settings comprise camera focus, camera gain, integration time, and white balance.

In an embodiment, the one or more imaging components comprise reflective or light scattering imaging systems.

In an embodiment, the one or more imaging components comprise transmission lighting imaging systems.

In an embodiment, the vial is a pharmaceutical grade vial. In an embodiment, the vial is a transparent glass vial.

In an embodiment, a size of the vial comprises an ISO format vial size or a custom format vial size. In an embodiment, the ISO format vial size comprises a 2R vial, 4R vial, 6R vial, 8R vial, 10R vial, 15R vial, 20R vial, 25R vial, 30R vial, 50R vial, or 100R vial. In an embodiment, the custom format vial size comprises a 3 ml vial, 10 ml vial, or 25 ml vial.

In an aspect, a region of interest (ROI) calibration standard for vial inspection is described herein. The ROI calibration standard comprises a vial comprising laser etchings on one or more portions of the vial, wherein the laser etchings comprise laser markings formed in a geometric pattern. In an embodiment, the geometric pattern comprises a line, circle, square, rectangle, or combination thereof.

In an embodiment, the one or more portions of the vial comprise a sidewall, a neck, a shoulder, or a combination thereof.

In an embodiment, the laser etching is disposed on an exterior surface of the vial. In an embodiment, the laser etching has a depth of less than about 40 microns from the exterior surface.

In an embodiment, the laser etching is disposed on an interior surface of the vial. In an embodiment, the laser etching has a depth of less than about 40 microns from the interior surface.

In an embodiment, the laser etching is disposed on an interior portion of the sidewall of the vial. In an embodiment, the laser etching has a thickness of less than about 40 microns.

In an embodiment, the ROI calibration standard is configured to calibrate one or more imaging components in an inspection system.

In an embodiment, the inspection system comprises one or more inspection lines, each inspection line having one or more imaging components.

In an embodiment, the one or more imaging components comprise one or more cameras.

In an embodiment, the ROI calibration standard is used to calibrate one or more cameras in the inspection system to capture images of a region of interest on a manufactured vial.

In an embodiment, the ROI calibration standard is used to calibrate spatial difference for one or more imaging components in the inspection system.

In an embodiment, the ROI calibration standard is rotated about a central axis and the laser etchings on the ROI calibration standard are used to calibrate spatial difference in the one or more cameras.

In an embodiment, the one or more imaging components comprise reflective or light scattering imaging systems.

In an embodiment, the one or more imaging components comprise transmission lighting imaging systems.

In an embodiment, the vial is a pharmaceutical grade vial. In an embodiment, the vial is a transparent glass vial.

In an embodiment, a size of the vial comprises an ISO format vial size or a custom format vial size. In an embodiment, the ISO format vial size comprises a 2R vial, 4R vial, 6R vial, 8R vial, 10R vial, 15R vial, 20R vial, 25R vial, 30R vial, 50R vial, or 100R vial. In an embodiment, the custom format vial size comprises a 3 ml vial, 10 ml vial, or 25 ml vial.

In an aspect, a method for calibrating a vial inspection system is described herein. The method for calibrating a vial inspection system comprises selecting a grayscale calibration standard of claim 1 based on a manufactured vial size; and calibrating an inspection system using the grayscale calibration standard.

In an embodiment, the calibration step comprises sending the grayscale calibration standard through one or more inspection lines in the inspection system.

In an embodiment, the calibration step further comprises calibrating one or more imaging components in the one or more inspection lines.

In an embodiment, the one or more imaging components comprise cameras.

In an embodiment, the one or more imaging components comprise reflective or light scattering imaging systems.

In an embodiment, the one or more imaging components comprise transmission lighting imaging systems.

In an embodiment, the method comprises calibrating one or more imaging components of a reflective or light scattering imaging system and one or more imaging components of a transmission lighting system in an inspection line.

In an embodiment, the method comprises calibrating one or more imaging components in a first inspection line and one or more imaging components in at least one other inspection line.

In an embodiment, the calibrating step comprises adjusting camera settings of the one or more imaging systems to ensure consistency between cameras.

In an embodiment, the camera settings comprise camera focus, camera gain, integration time, and white balance.

In an aspect, a method for calibrating a vial inspection system is described herein, The method for calibrating a vial inspection system comprises selecting a region of interest (ROI) calibration standard of claim 21 based on a manufactured vial size; and calibrating an inspection system using the ROI calibration standard.

In an embodiment, the calibration step includes sending the ROI calibration standard through one or more inspection lines of the inspection system to calibrate one or more imaging components in one or more inspection lines.

In an embodiment, the method comprises calibrating one or more imaging components across one or more inspection lines.

In an embodiment, the method comprises calibrating one or more imaging components of a first inspection line to capture a region of interest on a manufactured vial; and calibrating one or more imaging components of a second inspection line to capture a same region of interest on another manufactured vial.

In an embodiment, calibrating the inspection system comprises using the ROI calibration standard to align the one or more imaging components to capture a region of interest on a manufactured vial.

In an embodiment, calibrating the inspection system further comprises a user aligning the imaging components to capture the region of interest using laser etchings on the ROI calibration standard.

In an embodiment, the method further comprises calibrating the inspection system to capture a plurality of regions of interest on manufactured vials.

In an embodiment, each camera in an inspection line is calibrated to capture one region of interest of the plurality of regions of interest.

In an embodiment, the ROI calibration standard is used for calibrating spatial difference in images obtained by the one or more imaging components.

In an embodiment, measurements of the laser etchings on the ROI calibration standard are used to calibrate the spatial difference on a camera as the ROI calibration standard rotates, the ROI calibration standard oriented so a bottom of the ROI calibration standard is in contact with a horizontal surface of an inspection line and the body of the ROI calibration standard is rotating 360 degrees about a cylindrical axis in a clockwise or counterclockwise manner.

In an aspect, a vial inspection calibration system is described herein. The vial inspection calibration system comprises a grayscale calibration standard; a region of interest (ROI) calibration standard; and an inspection system comprising one or more inspection lines, each inspection line comprising one or more imaging systems having one or more imaging components.

In an embodiment, the grayscale calibration standard comprises a vial comprising laser etching, wherein the laser etching comprises a gradient image on a portion of the vial.

In an embodiment, the region of interest (ROI) calibration standard comprises a vial comprising laser etchings on one or more portions of the vial, wherein the laser etchings comprise laser markings formed in a geometric pattern.

In an embodiment, the one or more imaging components comprise one or more cameras.

In an embodiment, the one or more imaging components comprise reflective or light scattering imaging systems.

In an embodiment, the one or more imaging components comprise transmission lighting imaging systems.

In an embodiment, the vial inspection calibration system is a vial inspection calibration system for inspection of manufactured pharmaceutical grade vials.

In an embodiment, the system further comprises a data processor configured to receive image data transmitted from the one or more imaging components.

Additional aspects of the present disclosure will be set forth, in part, in the detailed description, figures and any claims which follow, and in part will be derived from the detailed description, or can be learned by practice of the disclosure. It is to be understood that both the foregoing general description and the following detailed description are exemplary and explanatory only and are not restrictive of the disclosure as disclosed.

BRIEF DESCRIPTION OF THE DRAWINGS

FIG. 4 shows a flowchart of a method, according to an embodiment of the disclosure.

DETAILED DESCRIPTION

Figure 1:
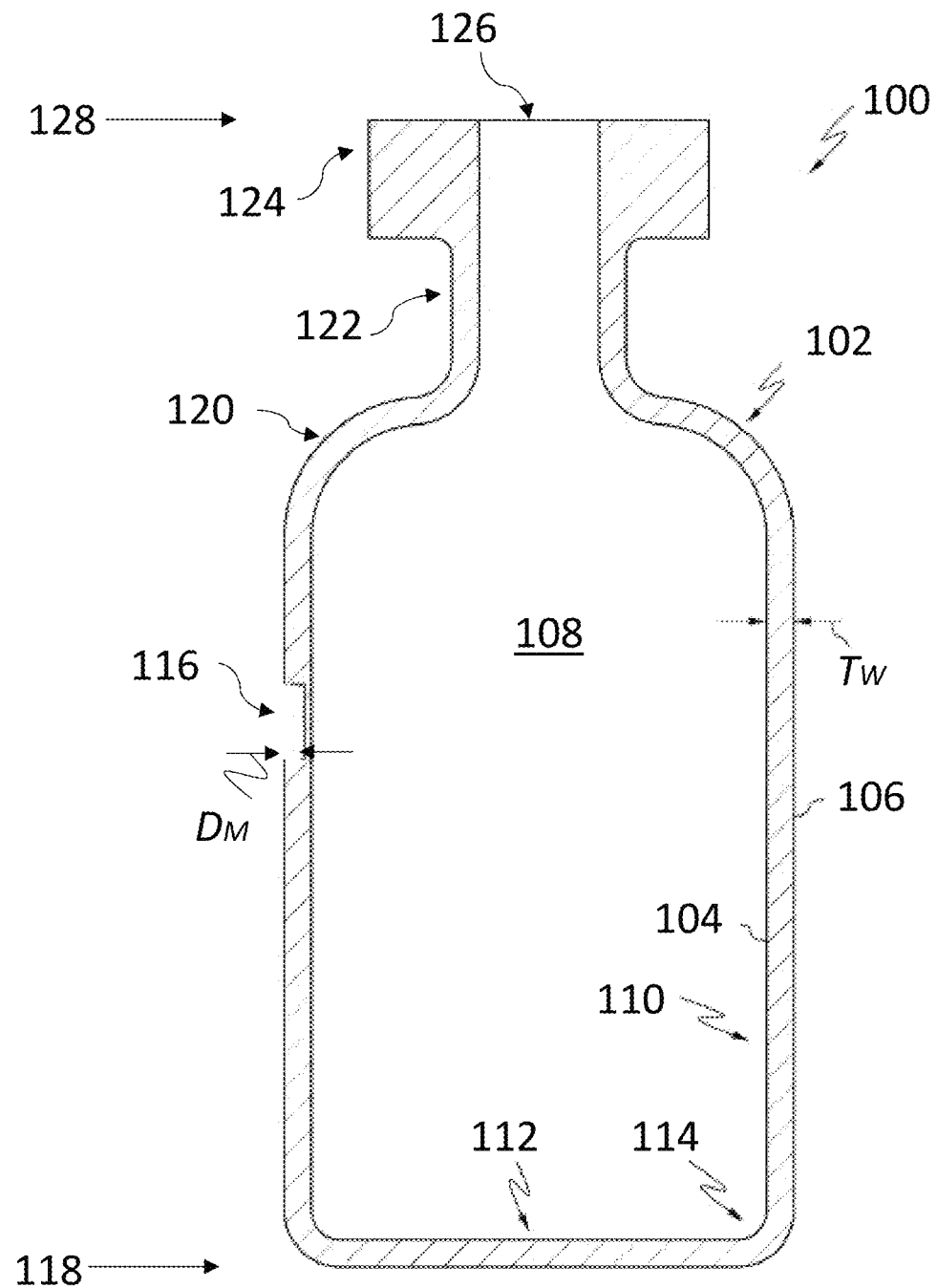
FIG. 1 shows an image of a schematic cross section of a calibration standard vial, according to one or more embodiments of the disclosure.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

One difficulty when inspecting vials is how to ensure the same inspection quality for all the inspection lines and cameras. One way to ensure the same inspection quality is to have a qualification of the metrology tooling. Thoroughly vetting the metrology may result in reduced classification errors during inspection by minimizing the false negatives and maximizing value by removing false positives. A vial without defects should receive a negative classification during vial inspection. Therefore, a false negative during inspection happens when the vial has a defect, but is classified as having no defect, and the vial is not flagged for rejection. A vial with defects should receive a positive classification during vial inspection, as this classification means that the vial is positive for a defect and is to be rejected. Therefore, a false positive during inspection happens when the vial is not defective, but is classified as having a defect, and is incorrectly flagged for rejection.

Thus, especially when expanding manufacturing facilities or increasing production, it becomes important for the metrology of the different manufacturing lines to be the same. However, difficulty arises because the cameras are at different physical locations, have different lighting, and are pointing at different locations on the vials. To ensure quality, the inspection tools must look at the same locations on each vial, look for the same defects, and be insensitive to ambient lighting and other variants that could change from line to line in order to provide a standard metrology setup.

To address this quality concern, the present subject matter provides calibration standards for use in setting up and calibrating a metrology system, as well as qualifying the setup using the calibration standard vials having specific flaws and defects.

In embodiments, the calibration standards comprise a robust marking, indelible to damage over a life cycle of more than about 500 uses. If markings on the standard wipe off, for example, the standard would no longer be useful.

In embodiments, the calibration standards comprise vials where regions of interest on the vials are marked for datum alignment against all inspection systems. The regions of interest ensure there is spatial correlation between all inspection systems. This feature of the present subject matter allows for control over external physical attributes of the vials, such as body, shoulder, and flange for spatial alignment of imaging system regions of interest.

In embodiments, the calibration standards allow for each region of the calibration standard vial to be calibrated correctly with no bias from region to region.

In embodiments, the calibration standards are configured to work for calibration of different modes of inspection. For example, the calibration standards described herein work when calibrating transmission lighting or reflection lighting in inspection systems.

In embodiments, the calibration standards are configured to mimic the glass vials which are to be inspected. For example, the calibration standards may mimic features of the glass vials to be inspected such as the weight for handling, the optical transmission and reflectance, the Index of Refraction, the deformation or plasticity, the mechanical robustness, and the dimensional accuracy.

The calibration standards described herein comprise vials and methods of using the calibration standard vials to calibrate imaging systems of inspection systems. The calibration standards allow for calibration of metrology systems across multiple lines. By creating gold standard vials that have specific laser marks, the calibration standards and methods described herein are used to determine the regions of inspection and to calibrate the greyscale of the line focus cameras.

The laser marked vials allow for calibrating the greyscale intensity on a non-planar surface (vial) for multiple modes of inspection, such as transmission and reflection imaging systems. As such, the calibration standards and methods of calibration provided herein differ from conventional calibration technologies that calibrate a single camera using a spatial scale of a line scan camera for 2D (flat) scans or that calibrate greyscale for a single mode of inspection (transmission OR reflection).

Embodiments disclosed herein provide durable calibration standards for inspection systems for manufactured vials, such as glass pharmaceutical vials, and methods of using the same. A grayscale calibration standard is provided for calibrating contrast of imaging components in an inspection system. The grayscale calibration standard comprises a vial having a laser etched gradient image on a portion of the vial. An ROI calibration standard is provided for calibrating spatial difference and aligning imaging components in an inspection system to capture regions of interest. The ROI calibration standard comprises a vial having laser etched marks or shapes on one or more portions of the vial. For example, the laser etched marks or shapes comprise lines, squares, circles, dots, or the like, or a combination thereof. By providing laser-marked calibration standards, the calibration standards may be used in many different modes of metrology.

Embodiments of the disclosure are directed to methods of providing standard inspection quality for all lines and cameras in a vial inspection system. The standard calibration process described herein ensures repeatable, consistent inspection quality. In some instances, the vial inspection system may comprise a plurality of inspection lines. As a nonlimiting example, a vial inspection system for manufacturing of glass vials may comprise two inspection lines for each manufacturing line. In some instances, the vial inspection system may comprise one inspection line. In some instances, the vial inspection system may comprise a plurality of manufacturing lines and a plurality of inspection lines.

Embodiments of the disclosure provide a durable calibration standard created by laser marking or etching of a vial with different marks. In embodiments, the calibration standard comprises marks such as lines and dots for ROI calibration. In embodiments, the calibration standard comprises marks such as a greyscale image for pixel intensity calibration. By providing a laser marked calibration standard, the calibration standard can be used in many different modes of metrology.

In embodiments, the calibration standard is a vial that is the same size (2R, 10R, etc.) as the manufactured vials to be inspected. By providing a vial that is the same size as the manufactured vials to be inspected, the imaging systems used for inspection may be calibrated to image and inspect the same position of a vial across multiple inspection lines. For such ROI calibration, a calibration standard vial comprising laser-etched markings such as lines, circles, or a combination thereof may be used.

Furthermore, by providing a vial that is the same size as the manufactured vials to be inspected, the imaging systems used for inspection may be calibrated to image and inspect vials using a same pixel intensity across multiple inspection lines. For such pixel intensity calibration, a calibration standard vial comprising a laser-etched gradient image may be used. By using the calibration standards, user error may be reduced during calibration of multiple inspection lines. Moreover, using the calibration standard vials described according to methods herein allows for calibration even when differences exist in lighting environments for the imaging systems in different inspection lines.

In embodiments, the calibration standard is a vial that has the same composition as the manufactured vials to be inspected. Therefore, the calibration standard will mimic the features of the glass vials which are to be inspected, such as the weight for handling, the optical transmission and reflectance, the Index of Refraction, the deformation or plasticity, the mechanical robustness, and the dimensional accuracy.

The calibration standard vial may comprise any suitable material. In some embodiments, the calibration standard vial may comprise a glass vial. The calibration standard vial may have any suitable glass composition. For example, the calibration standard vial may have a same composition as manufactured glass vials to be inspected. As a nonlimiting example, if the manufactured glass vials to be inspected are pharmaceutical grade glass vials, the calibration standard vial may have a same composition as the pharmaceutical grade glass vials to be inspected. For example, in some embodiments, the calibration standard may be formed from glass compositions such as described in U.S. Patent Application Publication No. 2013/0171456, U.S. Patent Application Publication No. 2013/0224407, U.S. Patent Application Publication No. 2014/0001076, U.S. Patent Application Publication No. 2014/0001143, U.S. Patent Application Publication No. 2014/0151320, U.S. Patent Application Publication No. 2014/0151321, U.S. Patent Application Publication No. 2014/0151370, U.S. Patent Application Publication No. 2015/0329416, U.S. Patent Application Publication No. 2015/0360999, U.S. Pat. Nos. 9,034,442, and 9,428,302, each of which are hereby incorporated by reference in its entirety.

In some embodiments, the calibration standard may comprise a plastic vial. The calibration standard vial may have any suitable plastic or polymeric composition. For example, the calibration standard vial may have a same composition as manufactured plastic vials to be inspected. As a nonlimiting example, if the manufactured plastic vials to be inspected are pharmaceutical grade plastic vials, the calibration standard vial may have a same composition as the pharmaceutical grade plastic vials to be inspected. In some embodiments, the plastic material may comprise a semi-transparent plastic material, a transparent plastic material, an opaque plastic material, or a heavily translucent plastic material. For example, in some embodiments, the calibration standard may be formed from a plastic or polymeric material comprising polystyrene, polymethylmethacrylate, polyvinyl chloride, polycarbonate, polysulfone, polystyrene copolymers, fluoropolymers, polyesters, polyamides, polystyrene butadiene copolymers, fully hydrogenated styrenic polymers, polycarbonate PDMS copolymers, and polyolefins such as polyethylene, polypropylene, polymethyl pentene, polypropylene copolymers and cyclic olefin copolymers.

Embodiments of the calibration standard and methods of use may be applicable for any suitable vial size. For example, the vial size may be a standard vial size or a custom vial size. Nonlimiting examples of standard vial sizes include ISO formats and custom formats. Nonlimiting examples of ISO formats comprise sizes 2R, 4R, 6R, 8R, 10R, 15R, 20R, 25R, 30R, 50R, and 100R. Nonlimiting examples of custom formats comprise sizes 3 ml, 5 ml, and 7 ml. 19. In some embodiments, the ISO format vial size comprises a 2R vial, 4R vial, 6R vial, 8R vial, 10R vial, 15R vial, 20R vial, 25R vial, 30R vial, 50R vial, or 100R vial. In some embodiments, the custom format vial size comprises a 3 ml vial, 105 ml vial, or 725 ml vial.

Embodiments of the calibration standard and methods of use may be applicable for any suitable type of medical cartridge. Nonlimiting examples include syringe cartridges, medical grade or pharmaceutical grade vials, such as vials for injectables (crimp neck, double chamber) and vials for non-injectables (threaded neck, flip cap). In some embodiments, the medical cartridge is a glass vial. In some embodiments, the medical cartridge is a plastic vial.

Reference will now be made in detail to various embodiments of calibration standards, methods for forming calibration standards, calibration standard systems, and methods of using calibration standards, examples of which are illustrated in the accompanying drawings.

Figure 2:
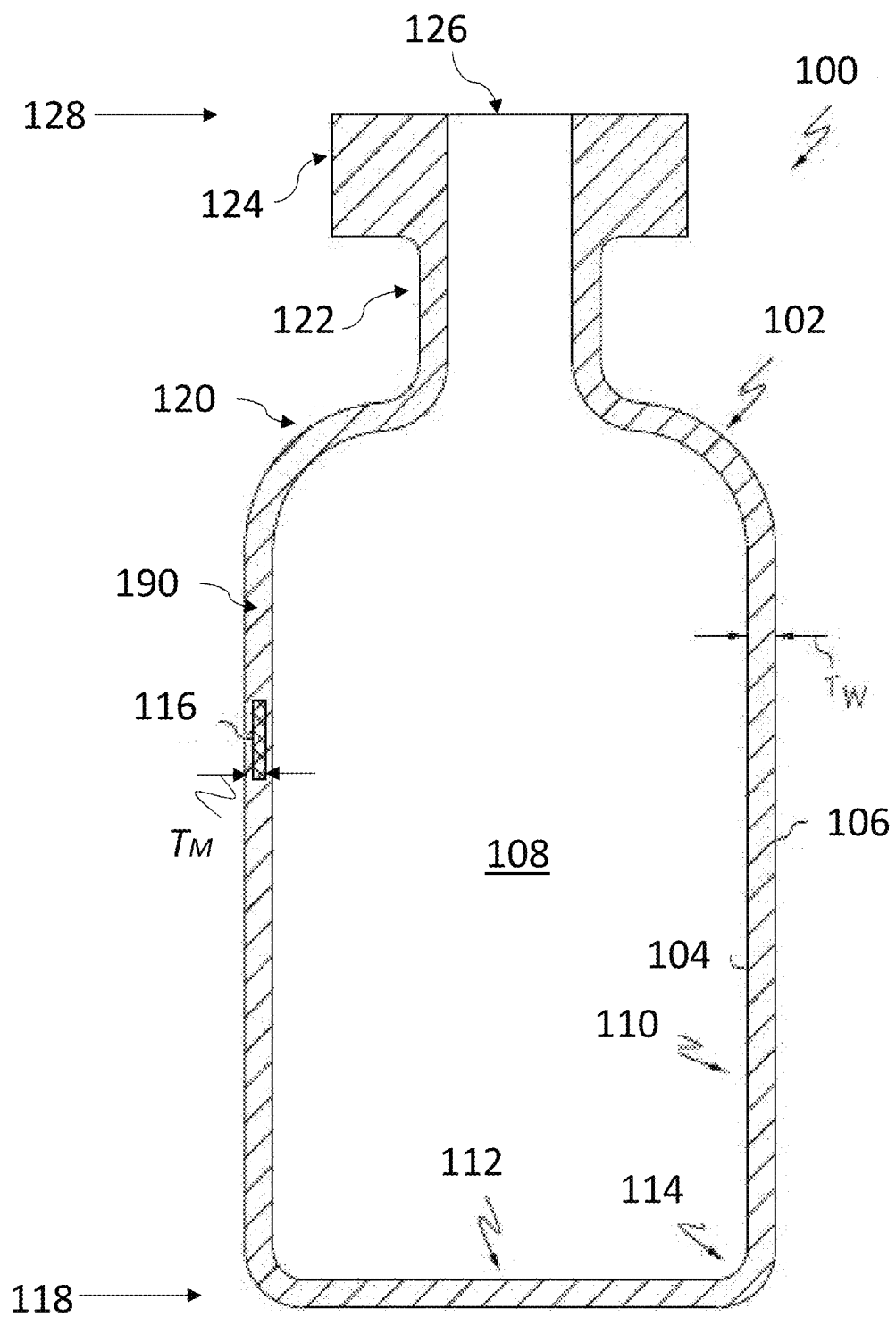
FIG. 2 shows an image of a schematic cross section of a calibration standard vial, according to one or more embodiments of the disclosure.
Figure 3:
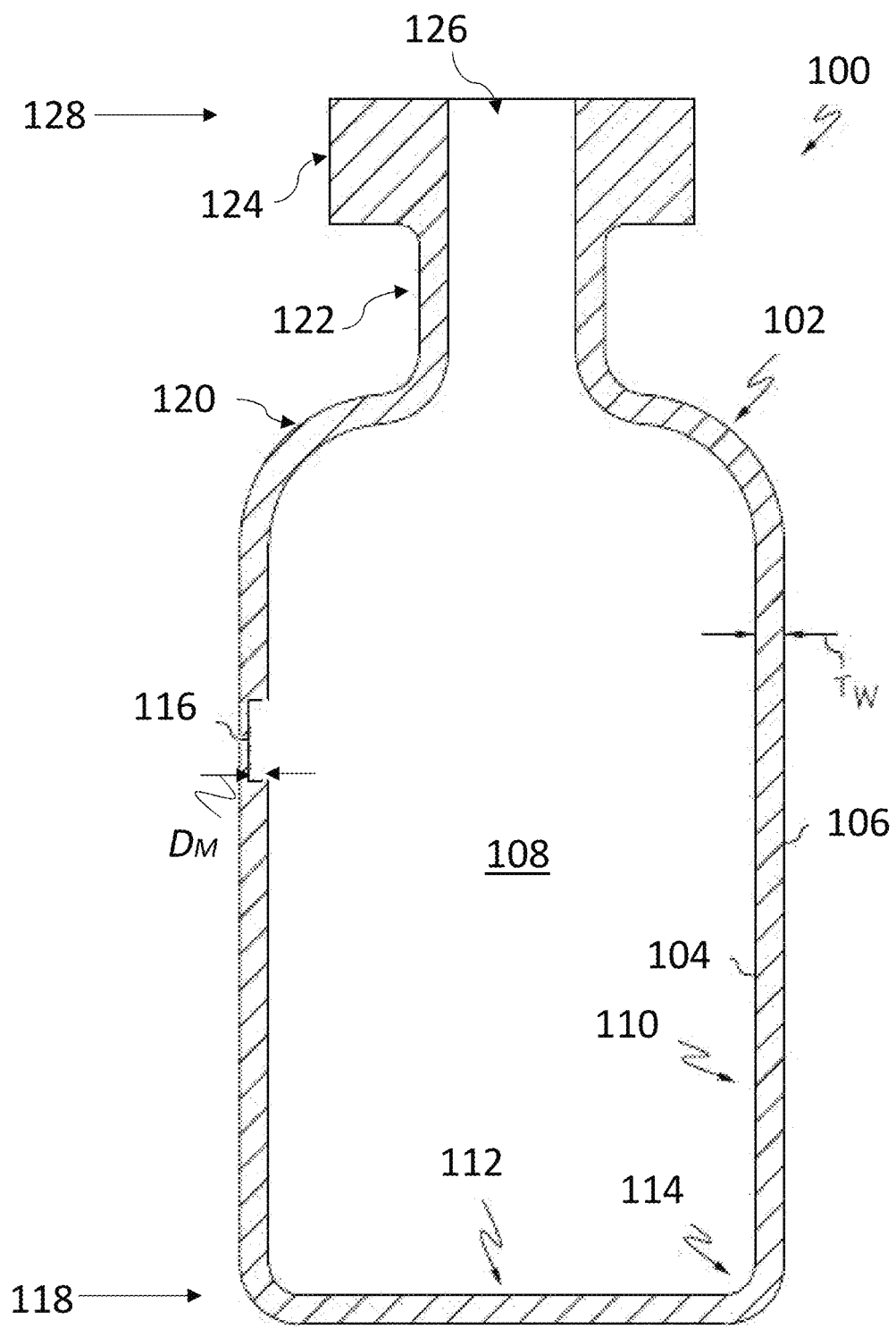
FIG. 3 shows an image of a schematic cross section of a calibration standard vial, according to one or more embodiments of the disclosure.

Referring to FIGS. 1-3, embodiments of calibration standard 100 are schematically depicted in cross section. In embodiments, the calibration standard is a glass vial with a curved cylindrical shape, such as a glass vial for storing a pharmaceutical formulation. Although various embodiments described such glass vials, it is further contemplated that the methodologies described may be implemented in other types of containers, such as plastic vials or the like. The calibration standard 100 generally comprises a body 102. The body 102 extends between an interior surface 104 and an exterior surface 106 and generally encloses an interior volume 108. The body 102 generally comprises a top portion 128, a wall or sidewall 110, and a floor 112 at a bottom 118 of the calibration standard. At the top portion 128 of the calibration standard 100, the body 102 transitions from a flange 124 having an opening 126 into the interior volume 108, to a neck 122, and to a shoulder 120, before the body 102 transitions into the wall 110. The wall 110 transitions into the floor 112 through a heel portion 114. The body 102 has a wall thickness Tw which extends between the interior surface 104 and the exterior surface 106. The calibration standard 100 also includes at least one laser etching or laser marking 116.

A nonlimiting example of a calibration standard with laser etchings on an exterior surface is schematically depicted in FIG. 1. The laser etchings or markings described herein for inclusion in the calibration standard vials may be etched into an exterior surface of a sidewall or wall thickness of the calibration standard and have minimal impact on the strength and/or damage resistance. The calibration standard 100 shown in FIG. 1 comprises at least one laser etching or laser marking 116 formed on the exterior surface 106. The laser etching extends a depth $D_M$ into the wall. Thus, the wall thickness of the body at the laser etching or marking is less than the wall thickness Tw of unmarked portions of the body.

A nonlimiting example of a calibration standard with laser etchings on an interior portion or thickness of a sidewall is schematically depicted in FIG. 2. The laser etchings or markings described herein for inclusion in the calibration standard vials may be etched into an interior portion or thickness of a sidewall of the calibration standard and have minimal impact on the strength and/or damage resistance. The calibration standard 100 shown in FIG. 2 comprises at least one laser etching or laser marking 116 formed on an interior portion 190 or thickness of the sidewall. The laser etching has a thickness $T_M$ less than the thickness of the unmarked sidewall Tw, so that the laser etching is disposed within the thickness of the sidewall.

A nonlimiting example of a calibration standard with laser etchings on an interior surface is schematically depicted in FIG. 3. The laser etchings or markings described herein for inclusion in the calibration standard vials may be etched into an interior surface of a sidewall or wall thickness of the calibration standard and have minimal impact on the strength and/or damage resistance. The calibration standard 100 shown in FIG. 3 comprises at least one laser etching or laser marking 116 formed on the interior surface 104. The laser etching extends a depth $D_M$ into the wall. Thus, the wall thickness of the body at the laser etching or marking is less than the wall thickness Tw of unmarked portions of the body.

The laser etchings 116 shown in FIGS. 1-3 are shown as being located in a wall 110 of the calibration standard. However, it should be understood that other locations are contemplated and possible. In some embodiments, the laser etching or marking 116 may be located in the heel portion 114, the bottom or floor portion 112, or in a flange 124, neck 122, or shoulder 120 of the calibration standard 100. In some embodiments, the laser etching or marking 116 is located in an area of the calibration standard 100 that is less sensitive to stresses and damage. For example, in such embodiments, the laser etching or marking 116 may be located in an area of the calibration standard 100 other than the floor portion 112.

FIG. 4 shows a method of using a grayscale calibration standard according to embodiments described herein. In an aspect, a grayscale calibration standard is provided. The grayscale calibration standard may be selected based on a size of manufactured vials to be inspected by the vial inspection system. For example, the grayscale calibration standard selected may be the same size as the manufactured vials to be inspected.

The grayscale calibration standard for vial inspection comprises a vial comprising laser etching, wherein the laser etching comprises a gradient image on a portion of the vial. The gradient comprises laser etching in the form of varying or different dots per inch (DPI). The calibration standard comprises a gradient image. The gradient image has dark or light pixels, wherein dark pixels comprise laser damage and light pixels comprise no laser damage. In embodiments, the laser damage is the same depth. When inspecting a vial, backlight is applied to identify defects and background anomaly. The contrast shows defects or flaws in the vial. The gradient from the calibration standard under same focus conditions is used to determine depth of the flaws.

The grayscale calibration standard may be used for calibration of the vial inspection system. In embodiments, the calibration standard is configured to calibrate one or more imaging systems for inspection of manufactured vials. For example, the calibration standard is used to adjust camera settings of the imaging systems to ensure consistency between settings of one or more cameras in the imaging system. Nonlimiting examples of camera settings comprise camera focus, camera gain, integration time, and white balance.

The method may comprise sending the grayscale calibration standard through a first inspection line and calibrating camera settings of the first inspection line to ensure consistency of camera settings in one or more imaging components of the first line. The grayscale calibration standard may be sent through or may travel through the vial inspection system along a path as though the calibration standard is a manufactured vial to be inspected. While traveling through the inspection system, the grayscale calibration standard may be used to calibrate the grayscale of one or more imaging components, such as cameras, within an imaging system based on the laser-etched design of the grayscale calibration standard. The method may further comprise sending the grayscale calibration standard through a second inspection line and calibrating camera settings of the second inspection line to ensure consistency of camera settings in one or more imaging components of the second line and to ensure consistency of camera settings of the first and second inspection lines. This calibration process using the grayscale calibration standard may continue throughout the inspection system. For example, the method may further comprise sending the grayscale calibration standard through an nth inspection line and calibrating camera settings of the nth inspection line to ensure consistency of camera settings in one or more imaging components of the nth line and to ensure consistency of camera settings of the first through nth inspection lines.

Calibration using the grayscale calibration standard ensures consistency of camera settings used for inspection. For example, the methods of calibrating using the grayscale calibration standard ensure camera settings are consistent throughout the one or more imaging systems within the inspection system. Said consistency of camera settings includes consistency of camera settings between one or more imaging components of a same inspection line, as well as one or more imaging components of multiple inspection lines.

In some embodiments, the method may further comprise inspecting manufactured vials using the calibrated vial inspection system. For example, manufactured vials may travel through an inspection line of the inspection system and each manufactured vial may be classified as accepted or rejected based on defects found.

In some embodiments, the method may comprise further calibration of the inspection system, such as calibration using a region of interest calibration standard.

Figure 5:
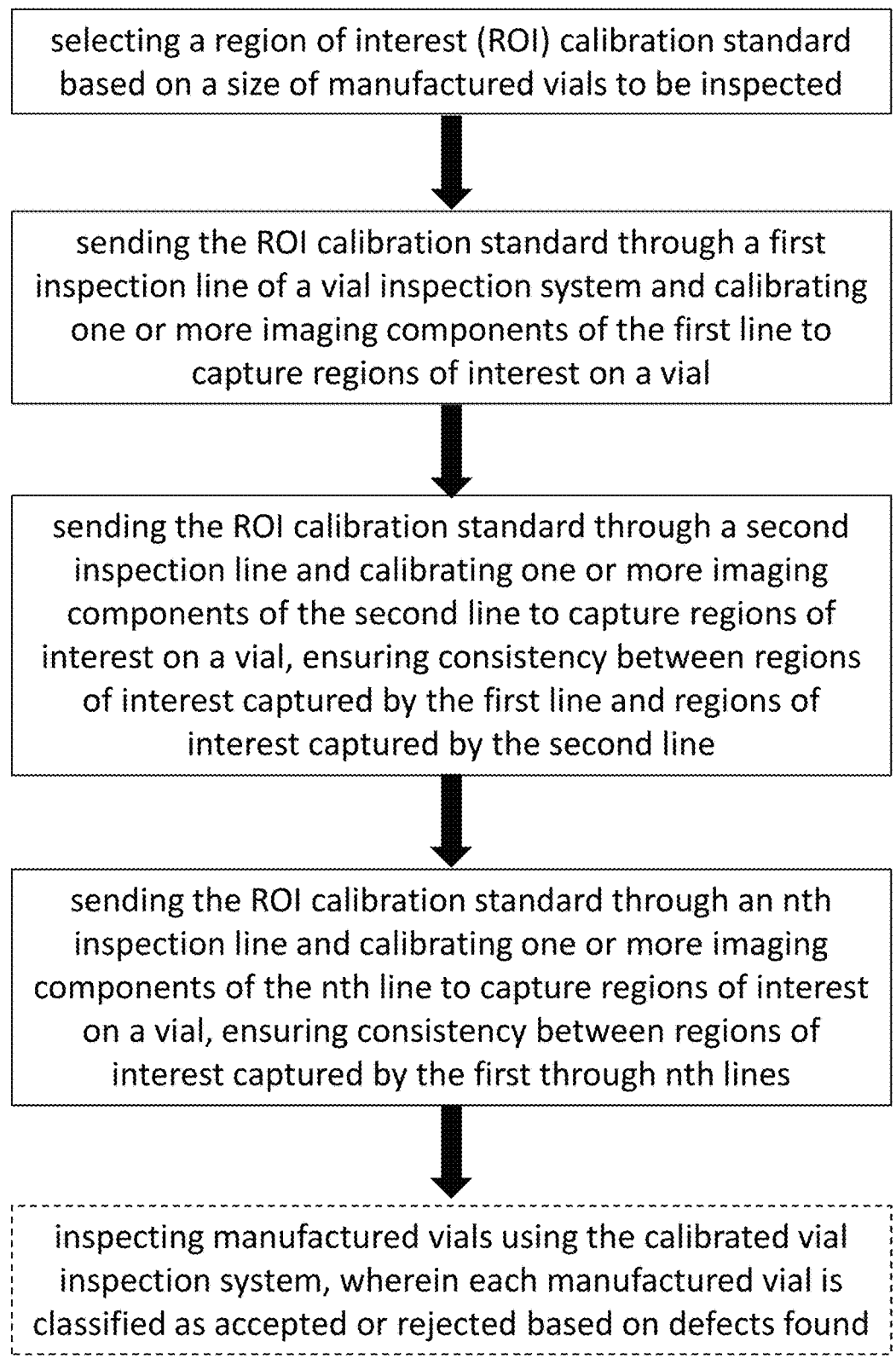
FIG. 5 shows a flowchart of a method, according to an embodiment of the disclosure.

FIG. 5 shows a method of using a region of interest (ROI) calibration standard according to embodiments described herein. In an aspect, a region of interest (ROI) calibration standard is provided. The ROI calibration standard may be selected based on a size of manufactured vials to be inspected by the vial inspection system. For example, the ROI calibration standard selected may be the same size as the manufactured vials to be inspected.

The ROI calibration standard for vial inspection comprises a vial comprising laser etchings on one or more portions of the vial, wherein the laser etchings comprise laser markings formed in a geometric pattern. The one or more portions of the vial may comprise a sidewall, a neck, a shoulder, or a combination thereof. For example, the geometric pattern may comprise a line, circle, square, rectangle, or combination thereof. The laser etchings may have a particular geometric pattern, such as spaced lines that correspond with a measured distance on a vial. In an example, a calibration standard may comprise a plurality of spaced lines, each line corresponding to a measured distance on a vial. In an example, a calibration standard may comprise a geometric pattern on a portion of the vial, such as a plurality of circles formed in a triangular pattern on a neck of the vial. In some embodiments, the geometric pattern of the laser etchings may be used to designate regions of interest on the vial. Furthermore, each laser etching on the calibration standard may be formed to be a particular size. For example, a laser etching in the shape of a line may have a specified length, specified width, and specified depth or thickness of the etching within the vial body. The size and geometric pattern of the laser etchings may be used to calibrate spatial difference within one or more imaging components of one or more imaging systems of the inspection system.

The ROI calibration standard may be used for vial inspection. In some embodiments, the ROI calibration standard may be used to calibrate one or more imaging components in an inspection system to capture desired regions of interest and to ensure consistency within the captured regions of interest as well as consistent spatial difference. The method may comprise sending the ROI calibration standard through a first inspection line of a vial inspection system and calibrating one or more imaging components of the first line to capture regions of interest on a vial. For example, an inspection system may comprise a plurality of imaging components, such as cameras. Each camera may be configured to capture a plurality of regions of interest on a vial. The calibration standard may be used to calibrate each camera to reduce or remove overlap of the regions of interest to be captured. In some embodiments, a plurality of cameras may be configured to capture different regions of a vial during inspection. The calibration standard may be used to calibrate the cameras to reduce or remove overlap of the regions of interest to be captured. Thus, calibration allows for reduction or removal of capturing overlapping regions of interest and thus reduces inspection time due to double counting of regions of interest. Calibration of the imaging systems to capture regions of interest also allows for reduction or removal of gaps or blind spots for vials in the inspection process.

In some embodiments, an inspection system may comprise multiple inspection lines, each inspection line comprising multiple cameras. The method may further comprise sending the ROI calibration standard through a second inspection line and calibrating one or more imaging components of the second line to capture regions of interest on a vial, ensuring consistency between regions of interest captured by the first line and regions of interest captured by the second line. The method may further comprise sending the ROI calibration standard through an nth inspection line and calibrating one or more imaging components of the nth line to capture regions of interest on a vial, ensuring consistency between regions of interest captured by the first through nth lines.

In some embodiments, the calibration standard may be used to calibrate cameras of one inspection line to capture the same region of interest as corresponding cameras on another inspection line. In some embodiments, an inspection line may comprise different types of imaging systems, such as transmission cameras and reflective cameras. The calibration standard may be used to calibrate transmission cameras to capture the same region of interest as corresponding reflective cameras for comparison.

In some embodiments, the calibration standard is used to calibrate spatial difference for one or more imaging components in an inspection system. In some examples, the spatial difference may be calibrated when the regions of interest are calibrated. The calibration standard comprises a cylindrical axis that extends in a vertical direction centrally from a top of the vial through the opening or aperture and down through the bottom of the vial. The calibration standard is rotatable around that axis, wherein the bottom of the vial is resting on a horizontal surface, such as an inspection line conveyer surface. The calibration standard is rotatable about that axis to calibrate spatial difference for one or more imaging components in an inspection system. As the calibration standard rotates, images are captured by the cameras. The spatial difference is calibrated by using the laser etchings on the calibration standard as shown in the captured images. In particular, the size of the laser etchings may be used to calibrate the spatial difference in the one or more imaging components as the vial rotates through the inspection line.

Calibration using the ROI calibration standard ensures consistency of captured regions of interest used for inspection as well as consistent spatial difference for imaging components in the inspection system. For example, the methods of calibrating using the ROI calibration standard ensure regions of interest and spatial difference are consistent throughout the one or more imaging systems within the inspection system, and in some examples includes consistency between different imaging components within different inspection lines. Ensuring consistency of regions of interest comprises calibrating one or more cameras throughout the inspection system so that the cameras are configured to capture regions of interest on a vial wherein a same region of interest captured by different cameras is at a same position on a vial. Consistency of regions of interest also allows for overlapping regions of interest or blind spots on a vial due to misalignment of regions of interest to be avoided or reduced.

In some embodiments, the method of calibrating using the ROI calibration standard may be performed before methods of calibrating using a grayscale calibration standard. In some embodiments, the method of calibrating using the ROI calibration standard may be performed after methods of calibrating using a grayscale calibration standard.

In some embodiments, the method may further comprise inspecting manufactured vials using the calibrated vial inspection system. For example, manufactured vials may travel through an inspection line of the inspection system and each manufactured vial may be classified as accepted or rejected based on defects found.

Figure 6:
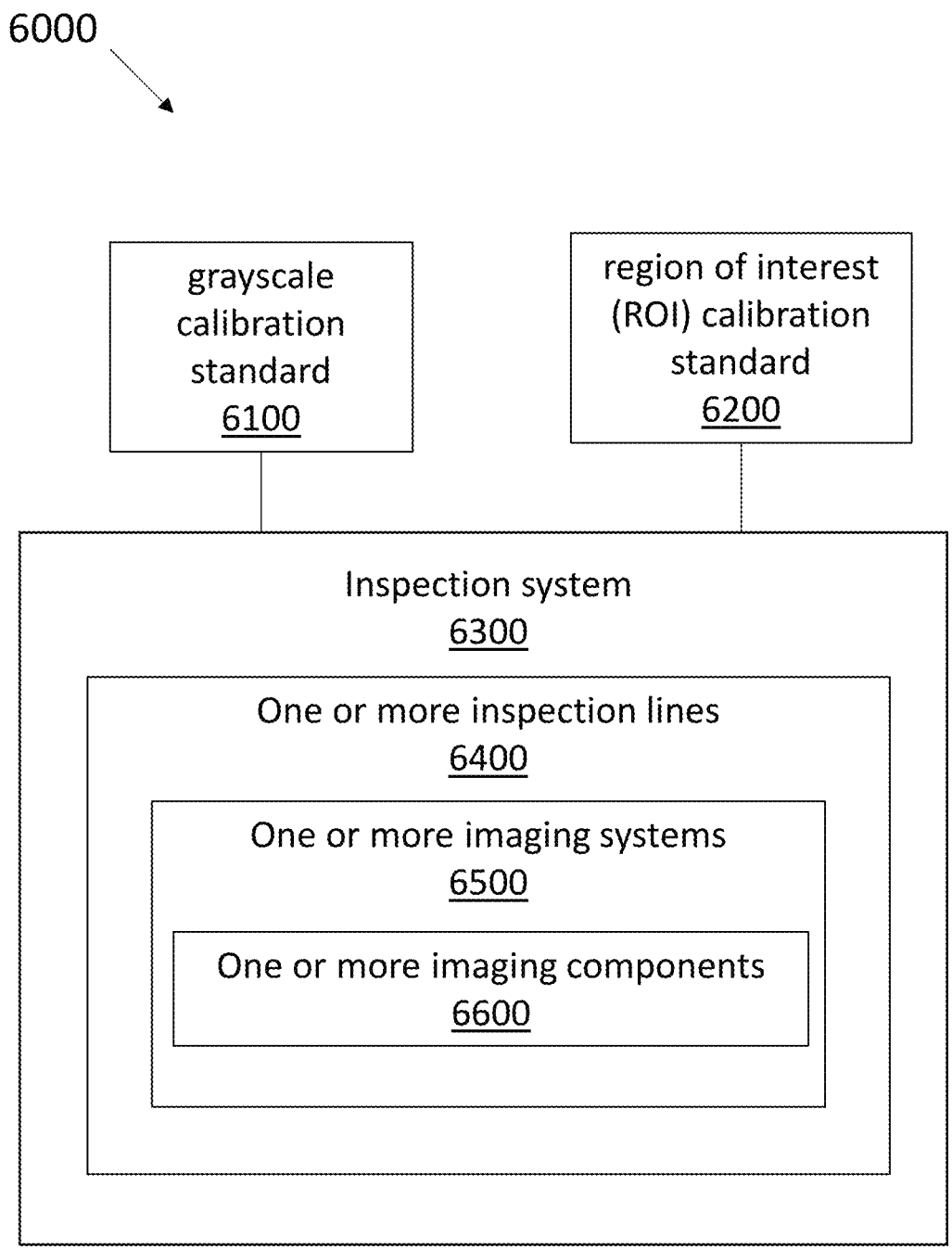
FIG. 6 shows a vial inspection calibration system according to an embodiment of the disclosure.

In an aspect, a vial inspection calibration system is provided. An embodiment of the vial inspection calibration system 6000 is shown in FIG. 6. Vial inspection calibration systems 6000 according to embodiments described herein may comprise a grayscale calibration standard 6100; a region of interest (ROI) calibration standard 6200; and an inspection system 6300. The vial inspection calibration system may be configured as a vial inspection calibration system for inspection of manufactured pharmaceutical grade vials.

The grayscale calibration standard 6100 may comprise a vial comprising laser etching, wherein the laser etching comprises a gradient image on a portion of the vial, according to embodiments described herein. The region of interest (ROI) calibration standard 6200 may comprise a vial comprising laser etchings on one or more portions of the vial, wherein the laser etchings comprise laser markings formed in a geometric pattern, according to embodiments described herein. The calibration standards 6100, 6200 are configured to travel through the inspection system 6300, wherein the calibration standards are used to calibrate components of the inspection system.

The inspection system 6300 may comprise an inspection system for manufactured pharmaceutical grade vials. The inspection system 6300 may comprise one or more inspection lines 6400. The inspection lines 6400 may comprise a surface upon which bottoms of manufactured vials rest. The surfaces may be flat, horizontal surfaces and may be capable of moving. For example, the surfaces may move in a conveyer belt fashion so as to propel the manufactured vials between the one or more imaging components of the inspection line. In some embodiments, the surface is configured to move such that vials having bottoms of the vials resting on the surface rotate 360 degrees about a central cylindrical axis. Each inspection line 6400 may comprise one or more imaging systems 6500 having one or more imaging components 6600. The one or more imaging components 6600 may comprise one or more cameras. The one or more imaging components 6600 may comprise reflective or light scattering imaging systems. The one or more imaging components 6600 may comprise transmission lighting imaging systems.

Figure 7:
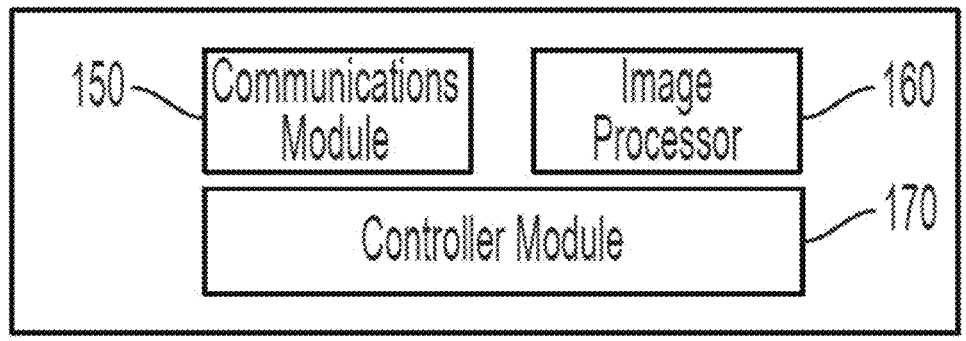
FIG. 7 shows a schematic illustration of components of one or more imaging systems for vial inspection in accordance with embodiments of the present disclosure.

FIG. 7 illustrates additional components of the one or more imaging systems 6500 of the inspection system 6300. Each of the one or more imaging systems 6500 of the inspection system 6300 may comprise an image processor 160 configured to receive image data transmitted from the one or more imaging components 6600. As shown, each imaging system 6500 may further include a controller module 170 configured to control the various components of the imaging system 6500. For example, the controller module 170 may be configured to control the one or more imaging components 6600. The controller module 170 may also be configured to control one or both of the communications module 150 and the image processor 160.

The imaging system 6500 may further include a communications module 150 configured to transfer images from the one or more imaging components 6600 to an image processor 160. The communication module 150 may be configured to communicate through a wired or wireless connection, including, but not limited to, a data connection conforming to one or more of the IEEE 802.11 family of standards (e.g., WiFi), a Bluetooth connection, a cellular network connection, an RF connection, a Universal Serial Bus (USB), an Ethernet connection, or any other data connection. The image processor 160 may be configured to record and analyze images received from the one or more imaging components 6600. The communications module 150, and image processor 160 may be on a single electronic device or multiple electronic devices, such as one or more desktop computers, laptop computers, tablet PCs, or other computer systems, as a user's particular setup of a vial inspection system of the present disclosure may require.

The controller module 170, communications module 150, and image processor 160 may interact so as to provide certain features to the imaging system 6500. For example, the system may be adapted to record the vial inspection image data (e.g., presence or absence of flaws or defects, locations of defects, depth of defects, etc.) in a non-transitory computer readable medium, and link the inspection image data with the region of interest vial image from which the data was extracted. The imaging system may provide additional functionality such as the ability to adjust the settings and parameters of the camera module, e.g., focal plane, aperture, shutter speed, sensitivity (e.g., ISO), white balance, etc. In some embodiments, the imaging system 6500 may be adapted to allow a user to record and/or analyze a vial inspection image or video. In other embodiments, the one or more imaging systems 6500 of the inspection system 6300 may communicate with a remote user device. The remote user device may be, e.g., a mobile phone device, a tablet computer, a desktop computer, a laptop computer or other computing system. The imaging systems 6500 may send one or more vial inspection images and/or associated data to the remote user device. In some embodiments, the remote user device may be adapted to control the one or more imaging systems 6500 of the inspection system 6300, such as by controlling the one or more imaging components 6600, including any of the functionality discussed above.

Figure 8:
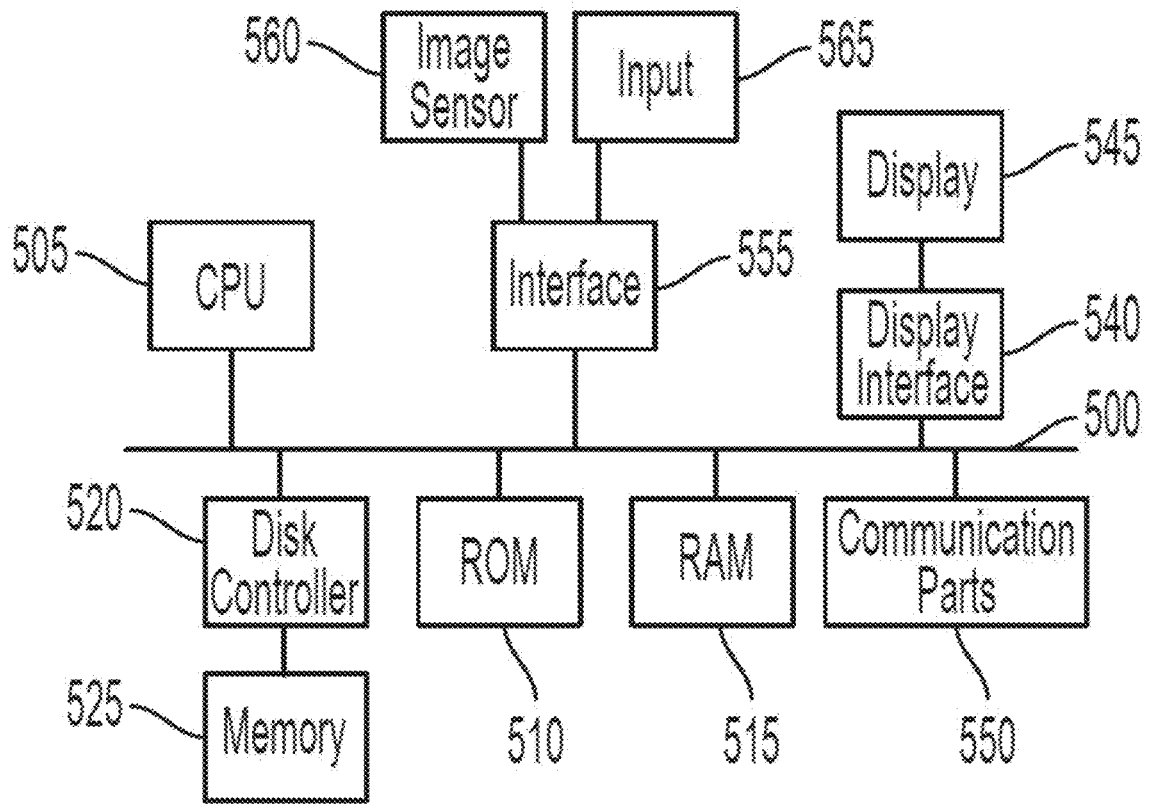
FIG. 8 depicts an example of internal hardware that may be used to implement the various computer processes and systems in accordance with embodiments of the present disclosure.

FIG. 8 depicts an example of internal hardware that may be used to contain or implement the various computer processes and systems as discussed herein. For example, the inspection system comprising one or more imaging systems discussed above may include mobile device hardware such as that illustrated in FIG. 7. An electrical bus 500 serves as an information highway interconnecting the other illustrated components of the hardware. CPU 505 is a central processing unit of the system, performing calculations and logic operations required to execute a program. CPU 505, alone or in conjunction with one or more of the other elements, is a processing device, computing device or processor as such terms are used within this disclosure. A CPU or "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments. Read only memory (ROM) 510 and random access memory (RAM) 515 constitute examples of memory devices. The term "memory device" and similar terms include single device embodiments, multiple devices that together store programming or data, or individual sectors of such devices.

A controller 520 interfaces with one or more optional memory devices 525 that serves as data storage facilities to the system bus 500. The memory devices 525 may include, for example, an external or internal disk drive, a hard drive, flash memory, a USB drive or another type of device that serves as a data storage facility. The various drives and controllers are optional devices. The memory devices 525 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 510 and/or the RAM 515. Optionally, the program instructions may be stored on a non-transitory, computer readable medium such as a compact disk, a digital disk, flash memory, a memory card, a USB drive, an optical disc storage medium, and/or other recording medium.

An optional display interface 540 may permit information from the bus 500 to be displayed on the display 545 in audio, visual, graphic or alphanumeric format. Communication with external devices may occur using various communication ports 550. A communication port 550 may be attached to a communications network, such as the Internet, a local area network or a cellular telephone data network. The hardware may also include an interface 555 which allows for receipt of data from input devices such as an imaging sensor 560 of a scanner or other input device 565 such as a keyboard, a mouse, a joystick, a touchscreen, a remote control, a pointing device, a video input device and/or an audio input device.

Experimental Setup

Laser marking of a vial was carried out. The vial was loaded into a fixture that positions the vial relative to a laser and camera. A camera was used to position the laser at a desired location on the vial. A laser was focused on the surface of the glass to create a micron-scale explosion, resulting in removal (ablation) of the material in a small localized area. The beam then translates relative to the glass and the process is repeated—hundreds of thousands of times per second.

Any laser system or systems, focusing devices, or combination thereof, may be used to create the laser etching, so long as the laser or lasers are suitable to create the desired laser damage or etching. As a nonlimiting example, a micromachining laser may be used. In an embodiment, a micromachining laser 532 nm picosecond PicoBlade® 2 laser (Lumentum Operations LLC, San Jose, California) was focused using a Scanlab Intelliscan galvanometer (SCANLAB GmbH, Germany) with a varioscan and a F-theta lens (100 mm). The diameter of the input beam was adjusted to give a spot size of less than about 10 microns. An advantage of using the galvanometer is that the only moving part is a mirror, so the relative motion of the laser and the glass can be very high. The laser operated at 5 W CW power and a repetition rate of 400 kHz, and the pulse energy was about 12.5 microJoules. The galvanometer translated the beam at 1 m/s. The laser program may be controlled via programming. In an embodiment, the laser program was controlled via the stage programming (Aerobasic). The stages would move to a specific (X,Y,Z) location and then call for the laser to execute the program. Then, the stages would move to a separate location and execute the laser again.

Any suitable depth or thickness of laser damage may be applied, so long as the desired laser damage for etching on the vials does not create a large amount of cracking on the glass vials. In some embodiments, the laser damage is shallow, such as on the scale of microns, so as not to cause breakage or cracking of the vial. In some embodiments, the laser damage has a depth or thickness of less than about 40 microns. In some embodiments, the laser damage has a depth or thickness in a range of about 10 microns to about 40 microns. In some embodiments, the laser damage has a depth or thickness in a range of about 15 microns to about 35 microns. In some embodiments, the laser damage has a depth or thickness in a range of about 20 microns to about 30 microns.

In an embodiment, the laser damage may be applied to an outer or exterior surface of a vial to form laser etching that may have a depth of less than about 40 microns from the exterior surface of the vial. In an embodiment, the laser damage may be applied to an inner or interior surface of a vial to form laser etching that may have a depth of less than about 40 microns from the interior surface of the vial. In an embodiment, the laser damage may be applied to an interior portion of a sidewall of a vial to form laser etching that may have a thickness of less than about 40 microns within the sidewall of the vial.

Laser etching may be conducted on vials in different states. For example, the laser marking may be carried out for vials in the pre-ion exchange state, post ion exchange state, and in coated vials. As nonlimiting examples, the vials may comprise a transparent coating or scratch resistant coating.

Laser Etching of Geometric Shapes

When creating laser damage, a single laser damage defect may be difficult to see. In order to create a visible laser damage area, a laser may be used to form geometric shapes. For example, the laser may be used to trace lines, circles, squares, dots, other shapes, or a combination thereof.

As a nonlimiting example, a plurality of laser-traced lines may be spaced a suitable distance apart on the vial. For example, the laser-traced lines may be spaced about 15 microns apart. Furthermore, each laser-traced line may be any suitable length, such as about 2 mm to about 15 mm in length. The number of lines in the plurality of lines may be adjusted to give the correct feature dimension for different sized vials.

As a nonlimiting example, a laser may be used to trace circular marks on a vial. For example, an outer circle may be marked with a laser and may have internal lines traced at a spacing of 15 microns to fill the circle in.

In embodiments, laser-marked shapes are provided at different locations on the calibration standard vials. The location of the shapes, such as lines and circles, depends on the size of vial to be inspected. For example, the locations of the laser-marked shapes for a 10R vial (45 mm tall) and a 3 ml vial are different.

Figure 9:
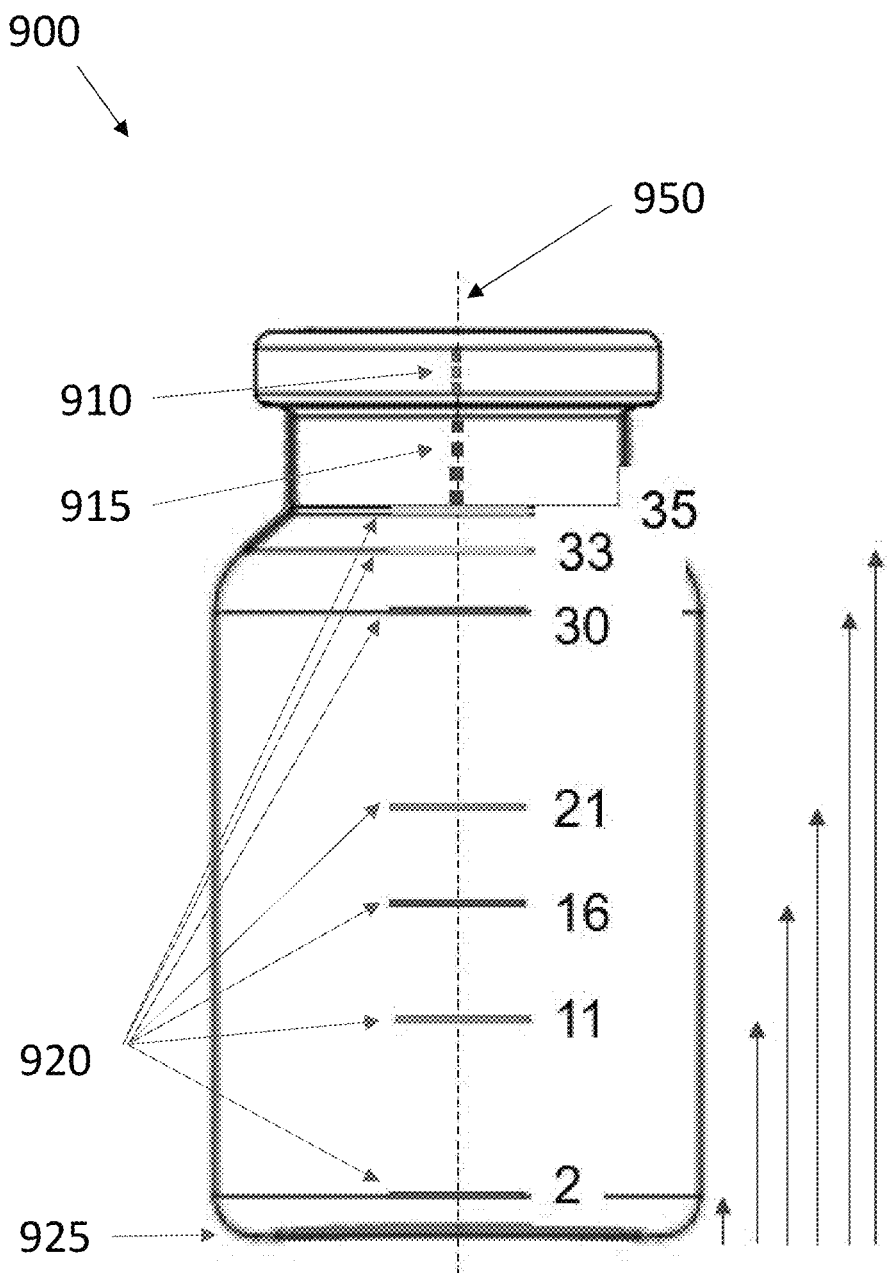
FIG. 9 shows an image of a side view of an ROI calibration standard vial, according to one or more embodiments of the disclosure.

FIG. 9 shows an image of an embodiment of a calibration standard vial 900. The calibration standard vial 900 has a cylindrical axis 950 that extends vertically through a center of the vial from a top of the vial to a bottom of the vial. The calibration standard 900 shown is an ROI calibration standard and comprises a plurality of laser etchings on portions of a 10R vial. The calibration standard 900 comprises laser etchings in the form of laser-marked squares 910 on a flange of the vial. Laser etchings in the form of laser-marked squares 915 are shown on the neck of the vial, wherein the laser-marked squares 915 have a larger size than the laser-marked squares 910. Laser etchings in the form of laser-marked lines 920 are shown on the shoulder and sidewall of the vial. For reference, a 10R vial is 45 mm tall. In the image shown in FIG. 9, a zero marking 925 is at the bottom of the vial, with the numbers next to lines 920 referring to mm markings moving upwards from the bottom to the top of the vial.

Figure 10A:
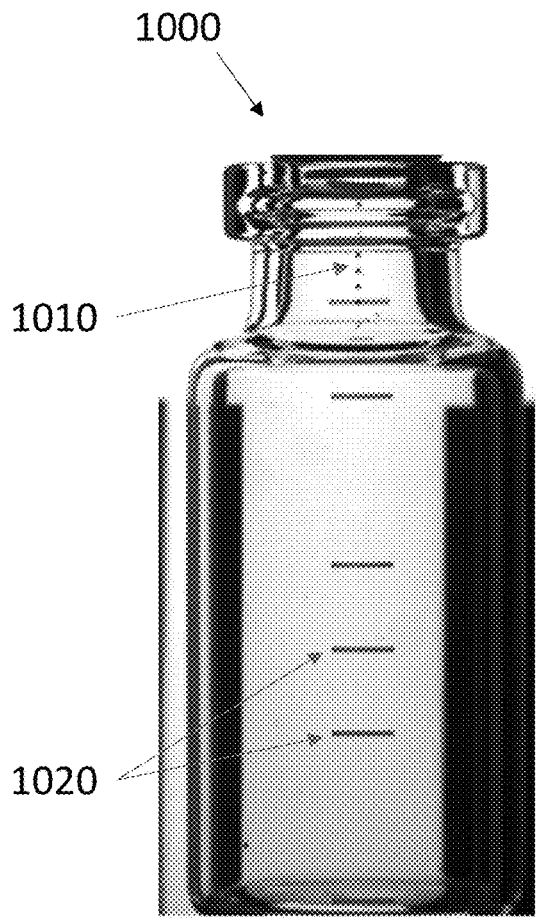
FIG. 10A shows a transmission view of a calibration standard vial, according to an embodiment of the disclosure.
Figure 10B:
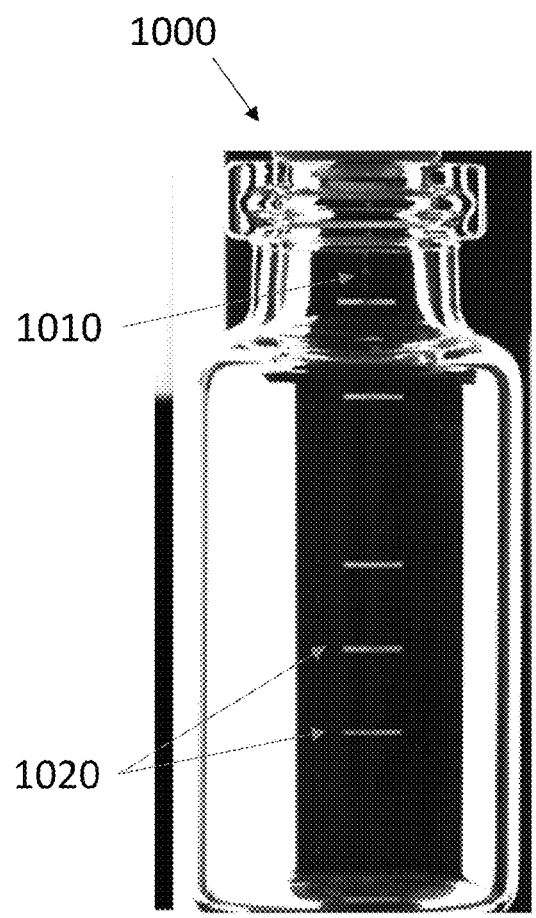
FIG. 10B shows a light scattered view of the calibration standard vial of FIG. 10A, according to an embodiment of the disclosure.

FIG. 10A shows a laser-marked calibration standard vial in a transmission view. FIG. 10B shows the laser-marked calibration standard vial in a light scattered view. The calibration standard vial 1000 comprises laser etchings in the form of laser marked circles or dots 1010 and laser marked lines 1020. The laser damage or laser etchings 1010, 1020 of the laser marked calibration standard vial 1000 in transmision shows up as dark, as the light is blocked by the laser damage. However, in the scattering view, the laser damage or laser etching 1010, 1020 shows up brightly because it scatters light effectively. Because calibration standard vials according to embodiments described herein are laser-etched, the laser marks show in both camera set-ups. For example, if calibration standard vials were instead marked with an ink based solution, such vials would only be able to be used in the transmission view. Therefore, calibration standard vials as described herein allow a same calibration vial to be used with multiple camera set-ups to ensure repeatable inspection set-up and comporable sizing of said defects across all cameras.

Figure 11:
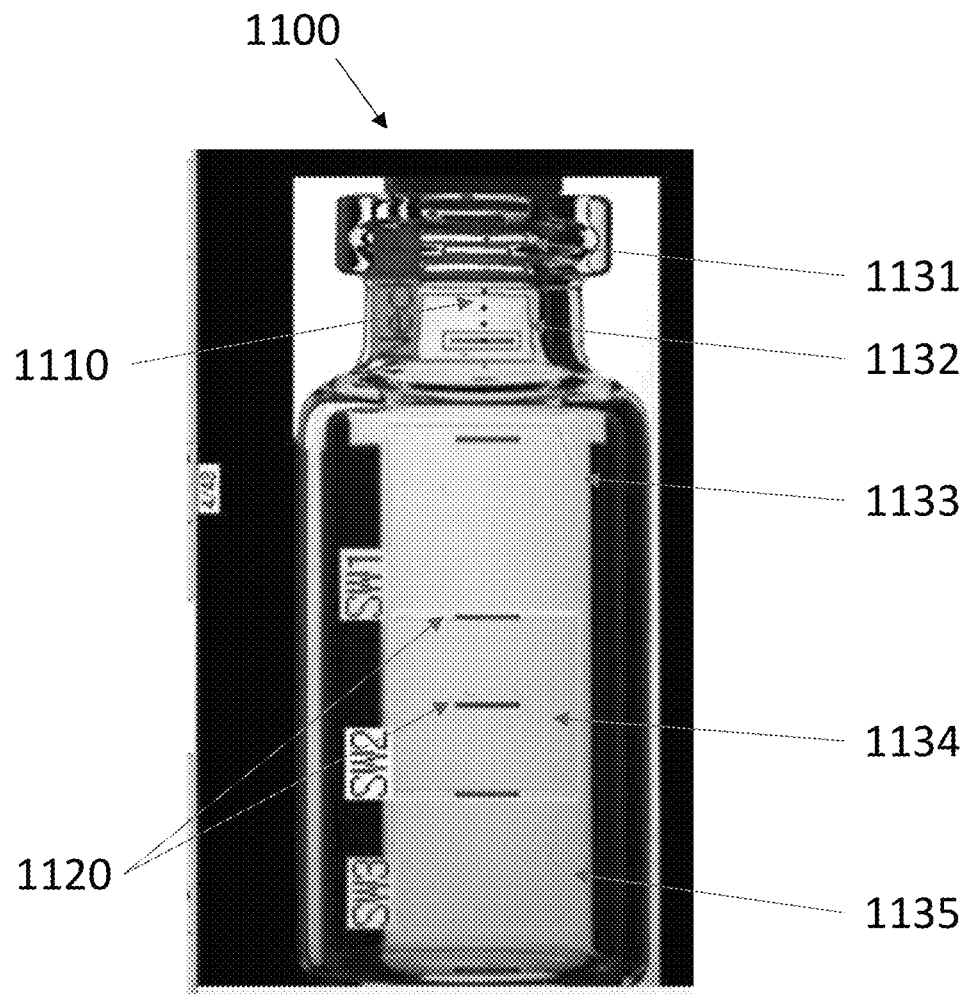
FIG. 11 shows an image of how laser-etched marks on a calibration standard vial are used to designate zones or regions of interest, according to an embodiment of the disclosure.

FIG. 11 shows an image of an embodiment of a calibration standard vial 1100 wherein laser-marked lines 1110, 1120 are used to calibrate zones or regions of interest 1131, 1132, 1133, 1134, 1135 in an inspection system. Different regions can be configured based on the laser marked etchings, shown in FIG. 11 as laser traced circles or dots 1110 and laser traced lines 1120.

Figure 12A:
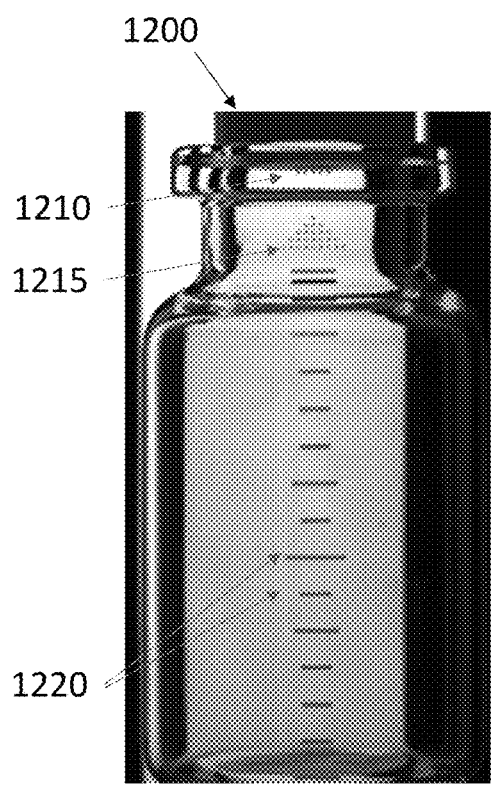
FIG. 12A shows a bright field transmission image of an ROI calibration standard vial, according to an embodiment of the disclosure.
Figure 12B:
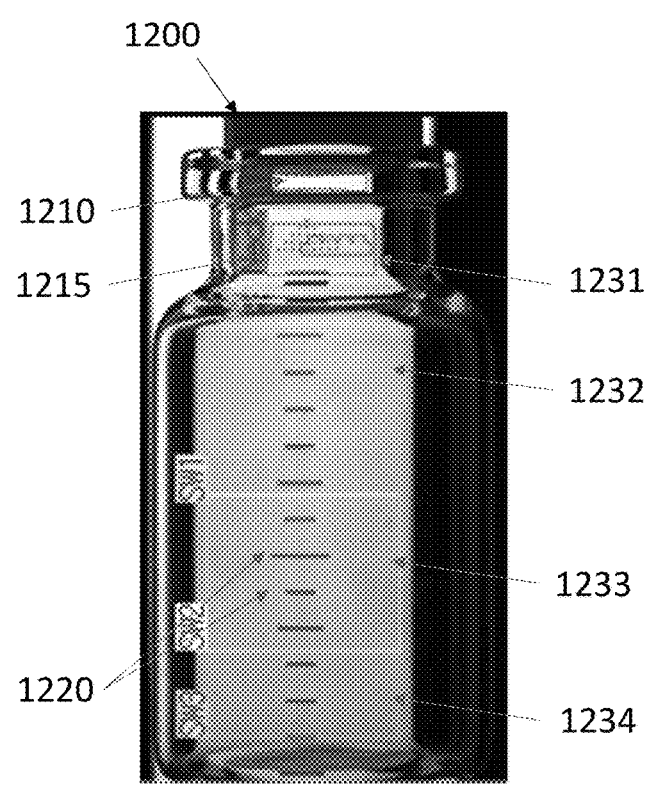
FIG. 12B shows a bright field transmission image of the vial of FIG. 12A with window placements to define regions of interest, according to an embodiment of the disclosure.

FIG. 12A shows a bright field transmission image of an embodiment of a calibration standard vial 1200. FIG. 12B is a bright field transmission image of the calibration standard vial 1200 shown in FIG. 12A that shows window placements 1231, 1231, 1233, 1234 over the laser-etched marks 1210, 1220. The laser etchings or marks are shown as laser-traced circles or dots 1210 arranged side by side in a line pattern on a flange of the vial, laser-traced circles of dots 1215 arranged in a triangular pattern on a neck of the vial, and laser-traced lines 1220 arranged and spaced a distance apart on a sidewall of the vial. The calibration standard vials comprising laser-etched markings or shapes shown in FIG. 12A and FIG. 12B may be used to set up imaging components in inspections systems. The window placements provided by the laser-etched marks may be used to define regions of interest and position cameras across inspection systems to be in alignment so that each camera captures the same region of interest.

Figure 13A:
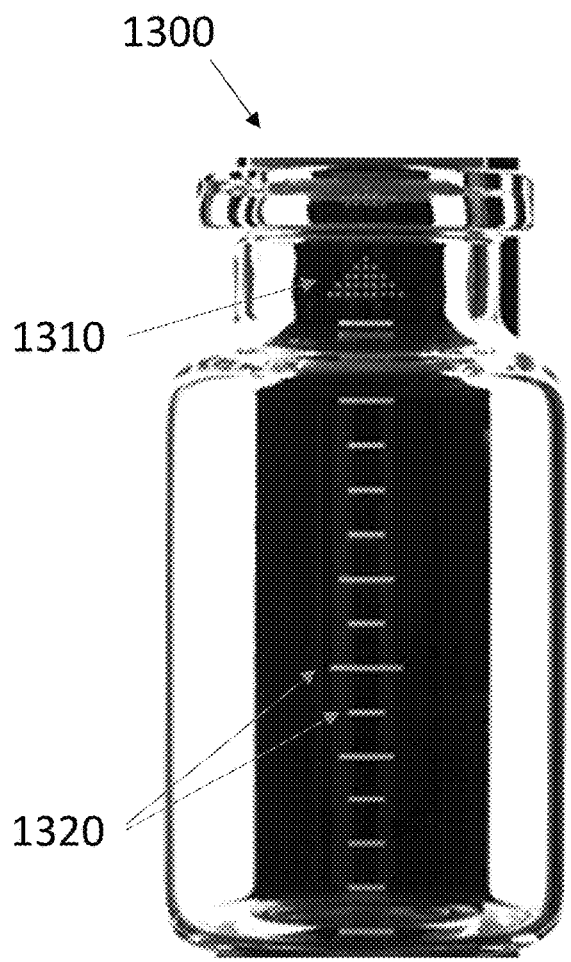
FIG. 13A shows a dark field image using light scattering of an ROI calibration standard vial, according to an embodiment of the disclosure.
Figure 13B:
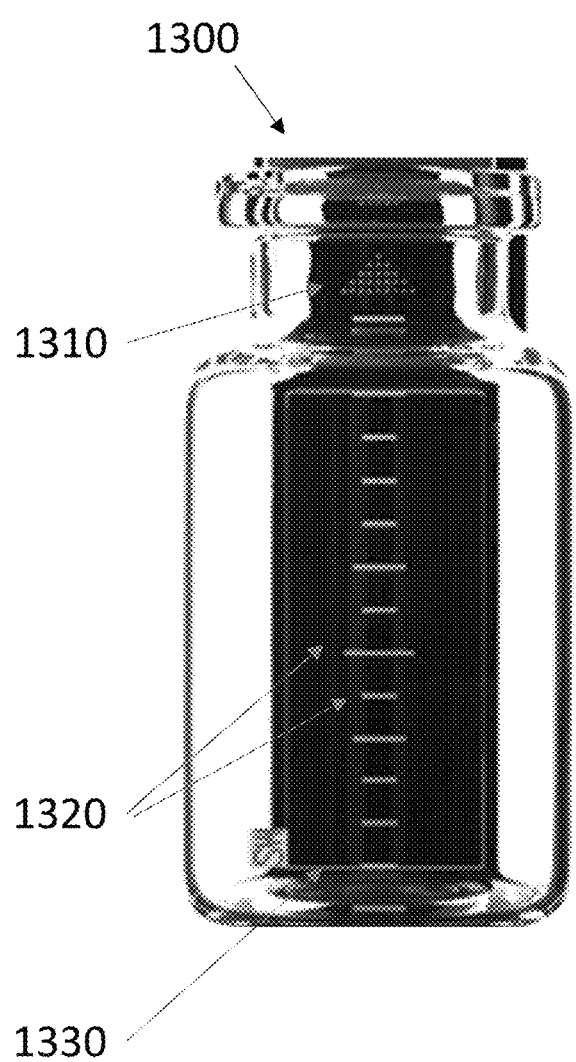
FIG. 13B shows a dark field image of the vial of FIG. 13A using the laser-etched lines for window alignment, according to an embodiment of the disclosure.

FIG. 13A shows a dark field image using light scattering of an embodiment of a calibration standard vial 1300. The calibration standard vial 1300 is an ROI calibration standard and comprises laser etchings 1310, 1320 in a geometric pattern on the vial. The laser etchings 1310 comprise a plurality of circles or dots arranged in a triangular pattern on a neck of the vial. The laser etchings 1320 comprise a plurality of spaced lines on a sidewall of the vial. The lines are of varying lengths and are spaced at intervals along the side of the vial. FIG. 13B shows how the laser-etched lines in the calibration standard vial 1300 of FIG. 13A may be used for window alignment. As shown, a window 1330 may be aligned using the laser etchings comprising one or more of the spaced lines 1320. In an embodiment, the window may designate a region of interest to be captured by an imaging component.

Laser Etching of Gradient

In certain embodiments, a laser marked gradient image is provided on a vial. To create a gradient laser-marked vial for calibration, the programming of the laser is important. For example, to create a specific image, programming is needed to either create laser damage on the vial while avoiding creation of laser damage on parts of the vial. The specific image may be made by any suitable programming. As a nonlimiting example, the image may be made via computer programming, such as via Python script, in order to create a bitmap image. The example image starts with an all-black bitmap on a first side and ends with an all-white bitmap on an opposite side. As the position in the bitmap image moves from the first side to the opposite side, the bitmap image randomly assigns a location to white, and the amount of white varies linearly with distance.

Figure 14:
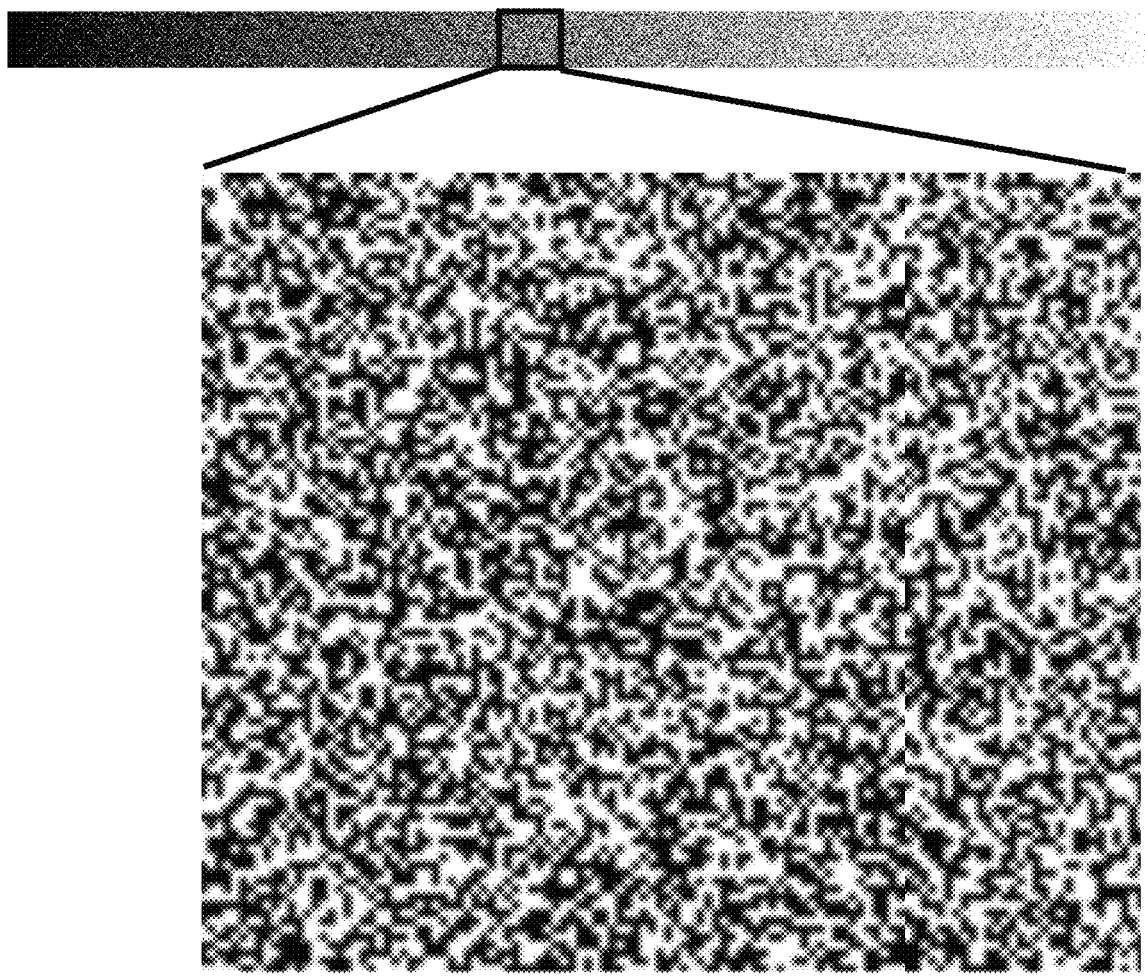
FIG. 14 shows an embodiment of a bitmap image showing the transition from all black to all white, according to an embodiment of the disclosure.

FIG. 14 shows an embodiment of a bitmap image showing the transition from all black to all white. Such a gradient forms the basis for the grayscale image or gradient image to be laser marked on a vial. The close-up view of the middle portion of the gradient image shows that the pixels are either high or low on the gradient. The high gradient pixels are shown as black, and the low gradient pixels are shown as white. Having pixels that are either high or low gradient simplifies the laser processing, as the laser is programmed to apply laser damage when there is a black pixel and is not applied when there is a white pixel. The laser marked gradient image may be any size that is suitable for placement on a vial. As a nonlimiting example, the laser marked gradient image may be about 20 mm×1 mm with a pixel spacing of 15 microns.

Figure 15A:
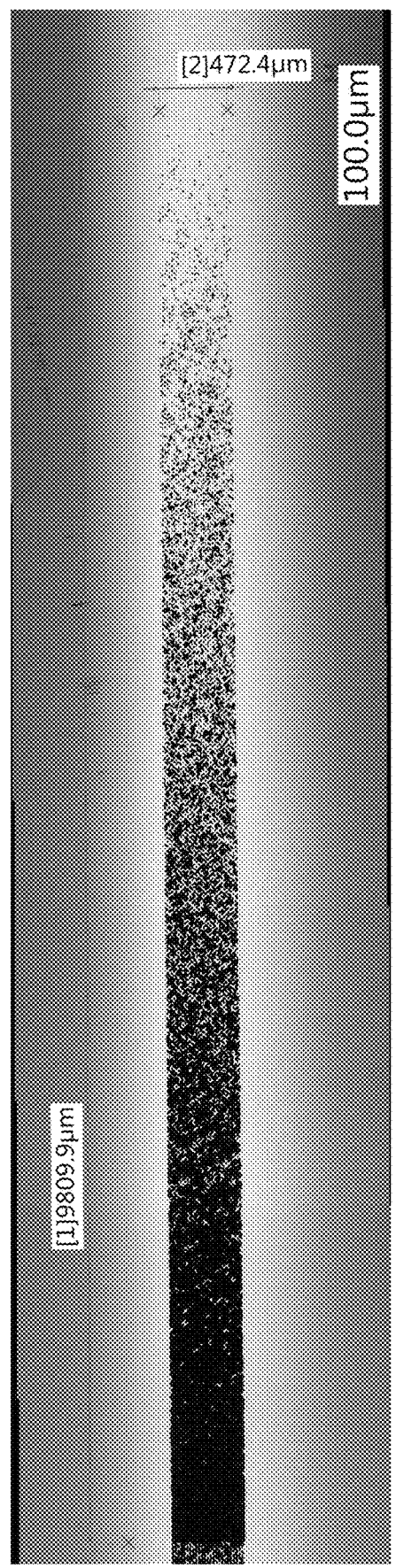
FIG. 15A shows a stitched microscope image of the side of a laser-marked calibration standard vial, according to an embodiment of the disclosure.
Figure 15B:
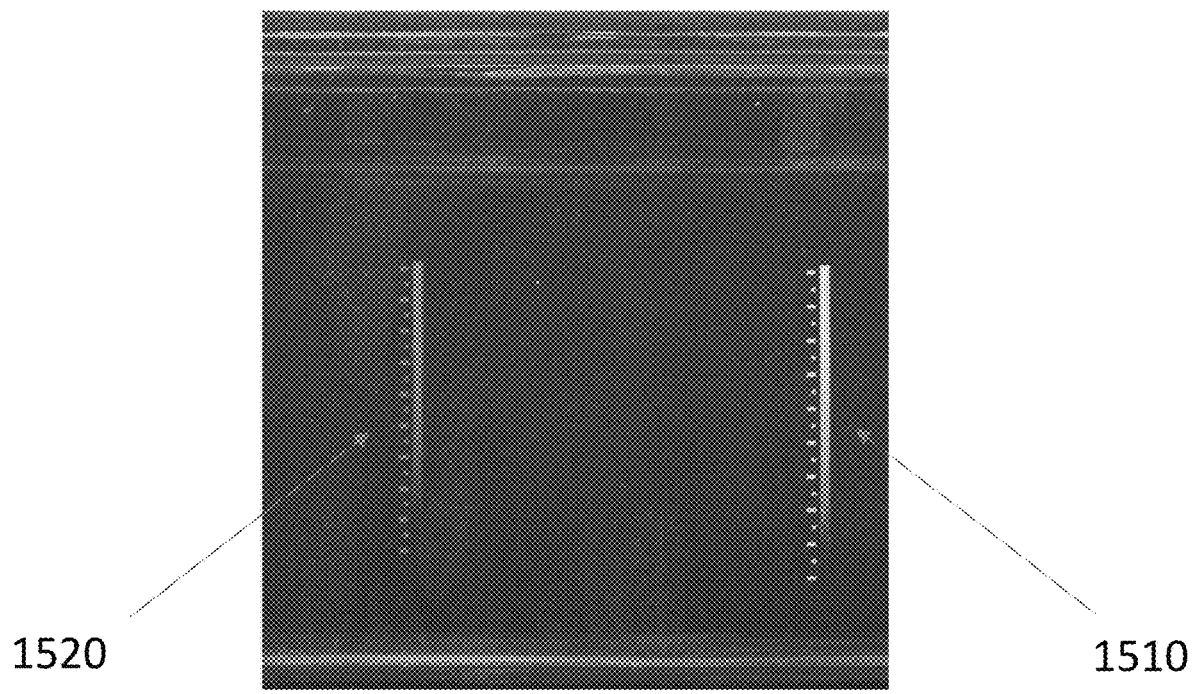
FIG. 15B shows an off-line metrology line scan of a dark field image of the same marks seen in FIG. 15A, according to an embodiment of the disclosure.

As described herein, the laser marked calibration standard may be used for both reflection and transmission imaging. FIG. 15A and FIG. 15B show images of a laser marked gradient on a vial, with the laser marked gradient visible using both bright field and dark field imaging. FIG. 15A shows a stitched microscope image of the side of a 10R vial that has been laser marked. Note that a stitched image is provided due to the field of view of a camera within the system, wherein the field of view is not large enough to capture the entire gradient. The intensity of the scattering goes from very high (left side of gradient shown as nearly all black) to almost none (right side of gradient shown). This laser marking provides a continuous range of values for the grayscale calibration, and because the laser marking is located on the side of a vial, it will have the correct lighting for an inspection system using bright field imaging. The intensity of the scattering goes from very high (top of gradient line showing nearly all white) to almost none (bottom of gradient). This laser marking provides a continuous range of values for the greyscale calibration, and because it is located on the side of a vial, it will have the correct lighting for an inspection system using dark field imaging. FIG. 15B shows an off-line metrology line scan of a dark field image of the same marks seen in FIG. 15A from the side of a 10R vial. The image was captured while the vial was rotating 360 degrees. The gradient image 1510 was captured on a front side of a vial with respect to the camera, and the faded gradient image 1520 on the left side of FIG. 15B is an image of the gradient reflected through an opposite side of the vial with respect to the camera. Each vial is rotated about its cylinder axis. Some cameras in the inspection system may be titled to view the vials from different angles. By knowing rotational velocity of the vial, the camera can be programmed to capture one complete rotation of the vial.

Figure 16A:
FIG. 16A shows a bright field image of a grayscale calibration standard, according to an embodiment of the disclosure.
Figure 16B:
FIG. 16B shows a dark field image of a grayscale calibration standard, according to an embodiment of the disclosure.

In embodiments, a calibration standard comprises a laser marked greyscale image for pixel intensity calibration. The laser marked greyscale image or gradient may be located on the side of a vial. The laser marked gradient is visible using bright field and dark field imaging inspection equipment. FIG. 16A shows a bright field image of a grayscale calibration vial 1600 with a laser gradient marking 1610. FIG. 16B shows a dark field image of the grayscale calibration vial 1600 with the laser gradient marking 1610.

Figure 17A:
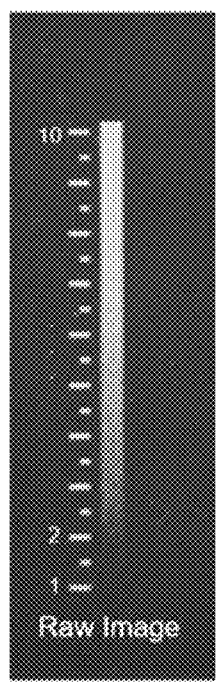
FIG. 17A shows a raw dark field image for a calibration standard, according to an embodiment of the disclosure.
Figure 17B:
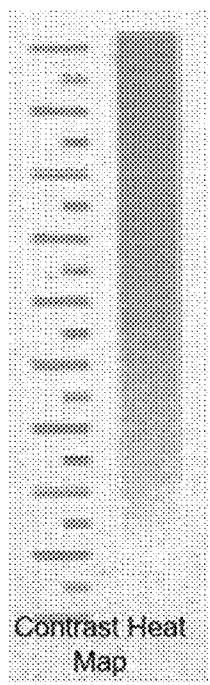
FIG. 17B shows a contrast heat map for the calibration standard vial of FIG. 17A, according to an embodiment of the disclosure.
Figure 17C:
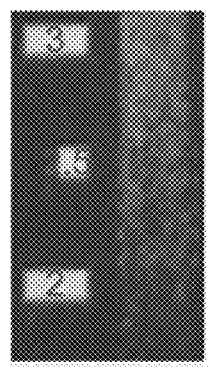
FIG. 17C shows a region for calibration of the calibration standard vial of FIG. 17A, according to an embodiment of the disclosure.

The dark field realization of the gradient was assessed. Samples were used to deduce a metric for dark field defects of a more scattering or diffuse nature. FIG. 17A shows the raw image, and FIG. 17B shows the contrast heat map. Analysis of the dark field defects resulted in determining the limit or limiting value, which was used to determine the region for calibration shown by FIG. 17C. The region from the top of line 2 to the top of line 2.5 shown in FIG. 17C is where the system can be calibrated to reject or accept certain greyscale values. Using the reference lines, the top of line 2 to the top of line 2.5 is a limit good. One additional pixel higher results in a limit bad. A box with the dots per inch (DPI) change was analyzed, as well as three boxes with lower DPI and three boxes with higher DPI. The response of the dark field inspection systems in the industry to boxes generated with the same DPI within the gradient values identified above will allow for three boxes which will reject due to sufficient contrast (higher DPI), three boxes which will be acceptable due to having a lower contrast (lower DPI), and one box directly at the limit itself.

Figure 18A:
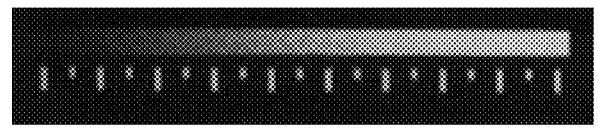
FIG. 18A shows a close-up view of a dark field image of a laser-etched gradient, according to an embodiment of the disclosure.
Figure 18B:
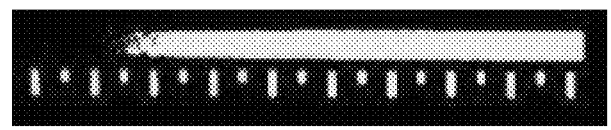
FIG. 18B shows a close-up view of the laser-etched gradient of FIG. 18A during post processing where a system sets a detection limit, according to an embodiment of the disclosure.

FIG. 18A is an image showing how the laser marked gradient image presents in a dark field view. FIG. 18B is an image showing the dark field view post-processing where the inspection system is used to set the detection limit.

Figure 19B:
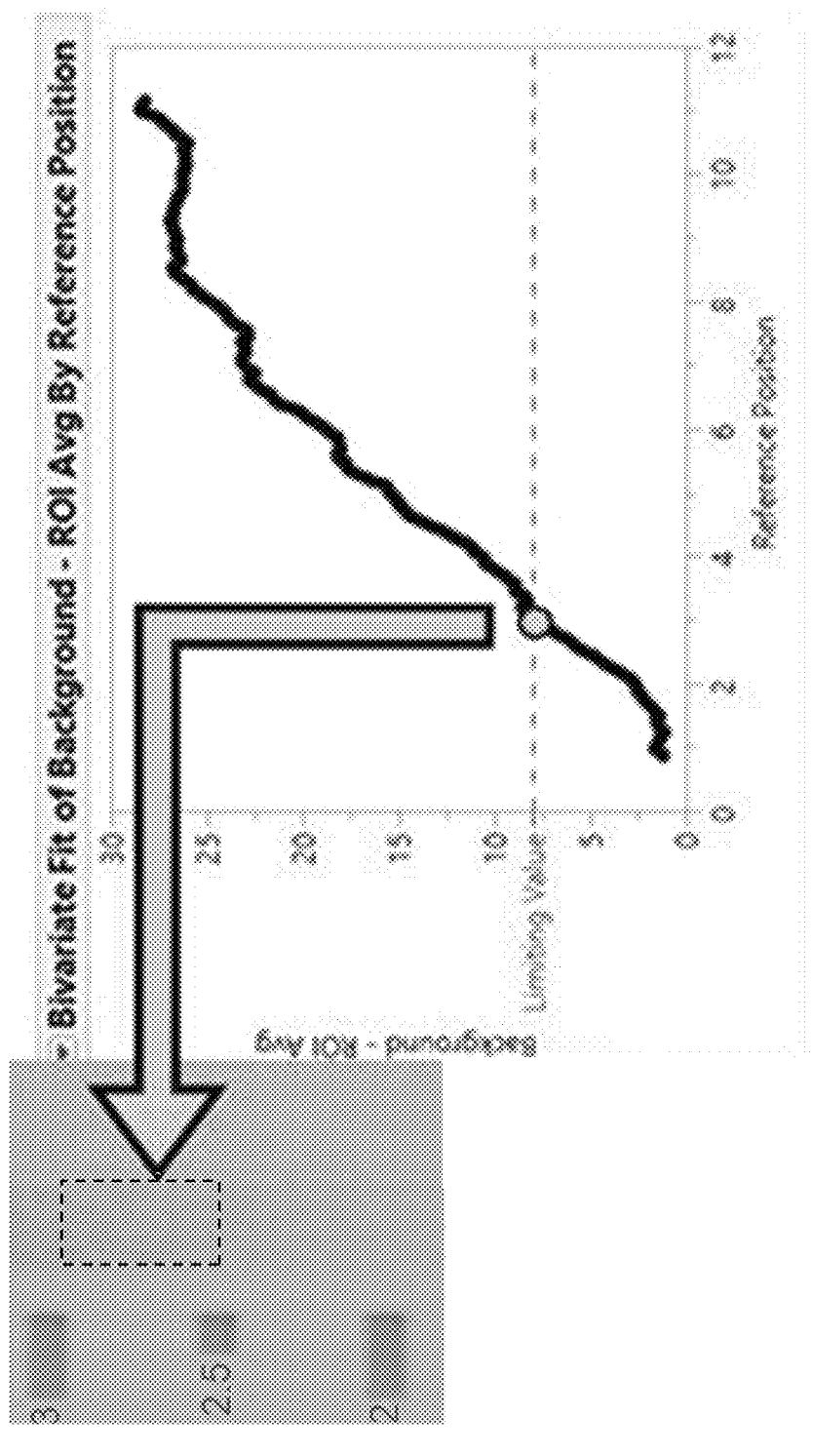
FIG. 19B shows a bright field image of the calibration region for the calibration standard and a graph showing the bivariate fit of background—ROI average by the reference position, according to an embodiment of the disclosure.
Figure 19A:
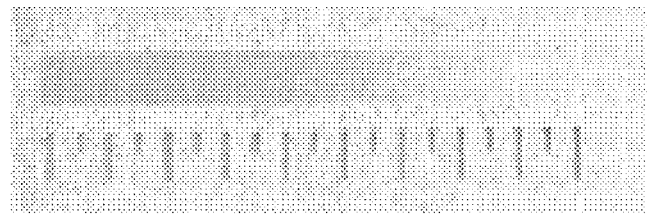
FIG. 19A shows a contrast heat map for a bright field image of a calibration standard, according to an embodiment of the disclosure.

The bright field realization of the gradient was also assessed. Samples were used to deduce field defects. FIG. 19A shows a contrast heat map. FIG. 19B shows a region where the system can be calibrated to reject or accept certain greyscale values (shown by a box on the left from line 2.5 to line 3), as well as a graph on the right. The graph shows the bivariate fit of background—ROI average by the reference position, with the limiting value shown as a dotted line. This shows the gradual change of the contrast over a given size with increasing DPI. The limit generated was based on a known defect which was observed within as-converted vials. The delta of background and area (0.3 mm^2)>8 in intensity. Analysis was conducted with the Low Pass filter data. The circled area corresponds to the box for the calibration region. To the naked eye, everything above position six looks the same, but to the camera, they are different all the way to 9. A box with the dots per inch (DPI) change was analyzed, as well as three boxes with lower DPI and three boxes with higher DPI. The response of the bright field inspection systems in the industry to boxes generated with the same DPI within the gradient values identified above will allow for three boxes which will reject due to sufficient contrast (higher DPI), three boxes which will be acceptable due to having a lower contrast (lower DPI), and one box directly at the limit itself.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, and like aspects, and ranges thereof, are for illustration only; they do not exclude other defined values or other values within defined ranges. The systems, kits, and methods of the disclosure can include any value or any combination of the values, specific values, more specific values, and preferred values described herein, including explicit or implicit intermediate values and ranges.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A grayscale calibration standard for vial inspection comprising:
   a vial comprising laser etching, wherein the laser etching comprises a gradient image on a portion of the vial,
   wherein the laser etching is disposed on a surface of the vial.

2. The grayscale calibration standard of claim 1, wherein the portion of the vial comprises a sidewall of the vial and the laser etching is positioned in a vertical orientation along the sidewall.

3. The grayscale calibration standard of claim 1, wherein the laser etching has a depth of less than about 40 microns from the surface.

4. The grayscale calibration standard of claim 1, wherein the calibration standard is configured to calibrate imaging systems for inspection of manufactured vials.

5. The grayscale calibration standard of claim 4, wherein the inspection system comprises one or more inspection lines, each inspection line having one or more imaging components.

6. The grayscale calibration standard of claim 4, wherein the one or more imaging components comprise one or more cameras.

7. The grayscale calibration standard of claim 6, wherein the calibration standard is used to adjust camera settings of the imaging systems to ensure consistency between camera settings of the one or more cameras.

8. The grayscale calibration standard of claim 4, wherein the one or more imaging components comprise reflective or light scattering imaging systems.

9. The grayscale calibration standard of claim 4, wherein the one or more imaging components comprise transmission lighting imaging systems.

10. The grayscale calibration standard of claim 1, wherein the vial is a pharmaceutical grade vial.

11. A method for calibrating a vial inspection system comprising:
    selecting a grayscale calibration standard of claim 1 based on a manufactured vial size; and
    calibrating an inspection system using the grayscale calibration standard.

12. The method of claim 11, wherein the calibration step comprises sending the grayscale calibration standard through one or more inspection lines in the inspection system.

13. The method of claim 12, wherein the calibration step further comprises calibrating one or more imaging components in the one or more inspection lines.

14. The method of claim 13, wherein the calibrating step comprises adjusting camera settings of the one or more imaging systems to ensure consistency between cameras.

15. A region of interest (ROI) calibration standard for vial inspection comprising:
    a vial comprising laser etchings on one or more portions of the vial, wherein the laser etchings comprise laser markings formed in a geometric pattern,
    wherein the laser etching is disposed on a surface of the vial.

16. The ROI calibration standard of claim 15, wherein the geometric pattern comprises a line, circle, square, rectangle, or combination thereof.

17. The ROI calibration standard of claim 15, wherein the one or more portions of the vial comprise a sidewall, a neck, a shoulder, or a combination thereof.

18. The ROI calibration standard of claim 15, wherein the ROI calibration standard is configured to calibrate one or more imaging components in one or more inspection lines in an inspection system.

19. The ROI calibration standard of claim 18, wherein the ROI calibration standard is used to calibrate spatial difference for one or more imaging components in the inspection system.

20. The ROI calibration standard of claim 19, wherein the ROI calibration standard is rotated about a central axis and the laser etchings on the ROI calibration standard are used to calibrate spatial difference in the one or more cameras.

21. A method for calibrating a vial inspection system comprising:
    selecting a region of interest (ROI) calibration standard of claim 15 based on a manufactured vial size; and calibrating an inspection system using the ROI calibration standard.

22. The method of claim 21, wherein the calibration step includes sending the ROI calibration standard through one or more inspection lines of the inspection system to calibrate one or more imaging components in one or more inspection lines.

23. The method of claim 22, wherein the method comprises calibrating one or more imaging components across one or more inspection lines.

24. The method of claim 23, wherein the method comprises:
calibrating one or more imaging components of a first inspection line to capture a region of interest on a manufactured vial, and
calibrating one or more imaging components of a second inspection line to capture a same region of interest on another manufactured vial.

25. The method of claim 22, wherein calibrating the inspection system comprises using the ROI calibration standard to align the one or more imaging components to capture a region of interest on a manufactured vial.

26. The method of claim 25, wherein calibrating the inspection system further comprises a user aligning the imaging components to capture the region of interest using laser etchings on the ROI calibration standard.

27. The method of claim 25, further comprising calibrating the inspection system to capture a plurality of regions of interest on manufactured vials.

28. The method of claim 27, wherein each camera in an inspection line is calibrated to capture one region of interest of the plurality of regions of interest.

29. The method of claim 21, wherein the ROI calibration standard is used for calibrating spatial difference in images obtained by the one or more imaging components.

30. The method of claim 29, wherein measurements of the laser etchings on the ROI calibration standard are used to calibrate the spatial difference on a camera as the ROI calibration standard rotates, the ROI calibration standard oriented so a bottom of the ROI calibration standard is in contact with a horizontal surface of an inspection line and the body of the ROI calibration standard is rotating 360 degrees about a cylindrical axis in a clockwise or counterclockwise manner.

* * * * *